US010825158B2

(12) United States Patent
Tanaka et al.

(10) Patent No.: US 10,825,158 B2
(45) Date of Patent: Nov. 3, 2020

(54) MOVING OBJECT MONITORING DEVICE, SERVER DEVICE, AND MOVING OBJECT MONITORING SYSTEM

(71) Applicant: PANASONIC INTELLECTUAL PROPERTY MANAGEMENT CO., LTD., Osaka (JP)

(72) Inventors: Shogo Tanaka, Kanagawa (JP); Kenji Tabei, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/486,353

(22) PCT Filed: Jan. 17, 2018

(86) PCT No.: PCT/JP2018/001107
§ 371 (c)(1),
(2) Date: Aug. 15, 2019

(87) PCT Pub. No.: WO2018/159121
PCT Pub. Date: Sep. 7, 2018

(65) Prior Publication Data
US 2019/0385291 A1    Dec. 19, 2019

(30) Foreign Application Priority Data
Feb. 28, 2017  (JP) .................. 2017-036882

(51) Int. Cl.
*G06T 5/50* (2006.01)
*G06T 7/30* (2017.01)
(Continued)

(52) U.S. Cl.
CPC .............. *G06T 5/50* (2013.01); *G06K 9/6201* (2013.01); *G06T 7/20* (2013.01); *G06T 7/30* (2017.01);
(Continued)

(58) Field of Classification Search
CPC .............. H04N 5/247; G06T 5/50; G06T 5/90
See application file for complete search history.

(56) References Cited

U.S. PATENT DOCUMENTS

2005/0110621 A1 * 5/2005 Hahn ..................... H04N 7/181
340/435
2009/0001269 A1    1/2009 Tadano
(Continued)

FOREIGN PATENT DOCUMENTS

JP    2005-167497    6/2005
JP    2009-010675    1/2009
(Continued)

OTHER PUBLICATIONS

International Search Report issued in International Pat. Application No. PCT/JP2018/001107, dated Apr. 17, 2018.

*Primary Examiner* — Zhubing Ren
(74) *Attorney, Agent, or Firm* — Greenblum & Bernstein, P.L.C

(57) ABSTRACT

Provided is a color camera that captures using environmental light, a monochrome camera that captures using infrared light, a signal processing unit that processes a signal of a color image output from the color camera and a signal of a monochrome image output from the monochrome camera, a storage unit that stores alignment information generated from a color image and a monochrome image captured in a state of sufficient environmental light, an alignment unit that performs an alignment based on alignment information to match positions of a subject shown in a color image and a monochrome image captured in a state of insufficient envi- (Continued)

ronmental light, and an image synthesis unit that acquires color information from the aligned color image and performs color conversion to colorize the monochrome image using the color information.

6 Claims, 17 Drawing Sheets

(51) Int. Cl.
*G06T 7/90* (2017.01)
*G06K 9/62* (2006.01)
*G06T 7/20* (2017.01)
*H04N 1/46* (2006.01)
*H04N 5/247* (2006.01)
*H04N 7/01* (2006.01)
*H04N 7/18* (2006.01)
*H04N 9/09* (2006.01)
*H04N 9/64* (2006.01)

(52) U.S. Cl.
CPC ............... *G06T 7/90* (2017.01); *H04N 1/465* (2013.01); *H04N 5/247* (2013.01); *H04N 7/0117* (2013.01); *H04N 7/181* (2013.01); *H04N 9/09* (2013.01); *H04N 9/646* (2013.01); *G06T 2207/10024* (2013.01); *G06T 2207/10048* (2013.01); *G06T 2207/20221* (2013.01)

(56) References Cited

U.S. PATENT DOCUMENTS

| 2014/0071245 A1* | 3/2014 | Zhang | H04N 13/239 |
| | | | 348/47 |
| 2015/0078678 A1* | 3/2015 | Grandin | H04N 5/23296 |
| | | | 382/284 |
| 2015/0324656 A1* | 11/2015 | Marks | G01J 5/0025 |
| | | | 383/103 |

FOREIGN PATENT DOCUMENTS

| JP | 2012-008924 | 1/2012 |
| JP | 2014-197727 | 10/2014 |
| JP | 2015-216635 | 12/2015 |

* cited by examiner

|  |  | FIRST PROCESSING MODE | SECOND PROCESSING MODE | THIRD PROCESSING MODE |
|---|---|---|---|---|
|  |  | BRIGHT STATE AT DAYTIME | DIMMED STATE AS IN SUNSET OR SUNRISE TIME ZONE | DARK STATE SUCH AS AT NIGHT |
| RESOLUTION CONVERSION | LEVEL | MINIMUM | MIDDLE | MAXIMUM |
| RESOLUTION CONVERSION | REDUCTION RATIO | 1 | 1/4 | 1/16 |
| AVERAGING REDUCTION | LEVEL | MAXIMUM | MIDDLE | MINIMUM |
| AVERAGING REDUCTION | REDUCTION RATIO | 1/16 | 1/4 | 1 |

ORIGINAL IMAGE

CASE IN WHICH LARGE GAIN IS UNIFORMLY GIVEN

CASE IN WHICH SMALL GAIN IS UNIFORMLY GIVEN

[ EXEMPLARY EMBODIMENT
CASE IN WHICH GRADATION
CORRECTION OPTIMIZED ACCORDING
TO AREAS IS PERFORMED ]

MOVING OBJECT MONITORING DEVICE, SERVER DEVICE, AND MOVING OBJECT MONITORING SYSTEM

TECHNICAL FIELD

The present disclosure relates to a moving object monitoring device that outputs an image obtained by capturing a monitoring area in which a moving object to be monitored appears, a server device that receives a color image and a monochrome image obtained by capturing the monitoring area at the moving object monitoring device from the moving object monitoring device through a network, and a moving object monitoring system that transmits the image obtained by capturing the monitoring area from the moving object monitoring device to the server device through the network.

BACKGROUND ART

A monitoring system for monitoring the status of a moving object such as a person to be monitored by installing a camera for capturing a monitoring area is widely used. In order for such a monitoring system to be able to continue monitoring even at night, a camera may be used, which irradiates a subject with infrared light and captures the subject.

While such capturing by the infrared light may provide a clear image, because the image is a monochrome image, there is a problem that it is difficult to identify the subject. Therefore, there is a need for a technology that enables improvement of the identification of a subject even in an image captured at night.

In response to such a demand, in related art, there is known a technique that captures a subject in color using visible light, captures a subject in monochrome using infrared light, uses the image captured by visible light as a background image, and superposes an image of a person extracted from an image captured using infrared light on the background image (see PTL 1).

CITATION LIST

Patent Literature

PTL 1: Japanese Patent Unexamined Publication No. 2009-010675

SUMMARY OF THE INVENTION

However, although this related art can improve the overall visibility of the image captured at night, it does not take into consideration the color reproduction of the important moving object. That is, since the image of the moving object is extracted from the captured image using infrared light, the color of the moving object cannot be discriminated. In particular, since the captured image using infrared light is shown with the inverted luminance, the blue clothes of a person are shown in white, for example, which results in occurrence of a false recognition of the mobile subject to be monitored. For this reason, use of the same for the application of monitoring of a moving object is not acceptable at all.

Therefore, according to the present disclosure, there is provided a moving object monitoring device, a server device, and a moving object monitoring system, which may faithfully reproduce the color of a moving object and output a color image with excellent visibility of the moving object even in a case of capturing in a state of insufficient environmental light, such as nighttime.

The moving object monitoring device according to the present disclosure relates to a moving object monitoring device that synthesizes a color image and a monochrome image obtained by capturing a monitoring area where a moving object to be monitored appears and outputs the synthesized image, in which the moving object monitoring device includes a color camera that captures the monitoring area using environmental light, a monochrome camera that captures the monitoring area using infrared light, a signal processing unit that processes a signal of a color image output from the color camera and a signal of a monochrome image output from the monochrome camera, a storage unit that stores alignment information generated based on a color image and a monochrome image captured in a state of sufficient environmental light, an alignment unit that performs an alignment, based on the alignment information, to match positions of images of a subject shown respectively in the color image and the monochrome image captured in a state of insufficient environmental light, and an image synthesis unit that acquires color information from the aligned color image and performs color conversion to colorize the monochrome image using the color information.

In addition, the server device according to the present disclosure is a server device that receives a color image and a monochrome image obtained by capturing, at a moving object monitoring device, a monitoring area where a moving object to be monitored appears, from the moving object monitoring device through a network, in which the server device includes a communication unit that receives a color image captured at the moving object monitoring device by a color camera that captures the monitoring area using environmental light and a monochrome image captured at the moving object monitoring device by a monochrome camera that captures the monitoring area using infrared light, a storage unit that stores alignment information generated based on the color image and the monochrome image captured in a state of sufficient environmental light, an alignment unit that performs an alignment, based on the alignment information, to match positions of images of a subject shown respectively in the color image and the monochrome image captured in a state of insufficient environmental light, and an image synthesis unit that acquires color information from the aligned color image and performs color conversion to colorize the monochrome image using the color information.

In addition, the moving object monitoring system according to the present disclosure transmits a color image and a monochrome image obtained by capturing, at a moving object monitoring device, a monitoring area where a moving object to be monitored appears, from the moving object monitoring device to a server device through a network, in which the moving object monitoring device includes a color camera that captures the monitoring area using environmental light, a monochrome camera that captures the monitoring area using infrared light, a signal processing unit that processes a signal of a color image output from the color camera and a signal of a monochrome image output from the monochrome camera, a storage unit that stores alignment information generated based on the color image and the monochrome image captured in a state of sufficient environmental light, an alignment unit that performs an alignment, based on the alignment information, to match positions of images of a subject shown respectively in the color image and the monochrome image captured in a state of insufficient environmental light, an image synthesis unit that acquires color information from the aligned color image and performs color conversion to colorize the monochrome image using the color information, and a communication unit that transmits a synthesized image acquired by the image synthesis unit to the server device.

According to the present disclosure, the color image and the monochrome image captured in a state of insufficient environmental light, such as nighttime are aligned based on the alignment information generated from the color image and the monochrome image captured in a state of sufficient environmental light such as daytime, so that the alignment may be performed with high accuracy. Then, the color information is acquired from the accurately-aligned color image, and the color information is used to colorize the monochrome image, so that the color of the moving object is faithfully reproduced, and a color image of the moving object with excellent visibility may be output.

DESCRIPTION OF EMBODIMENTS

Figure 1:
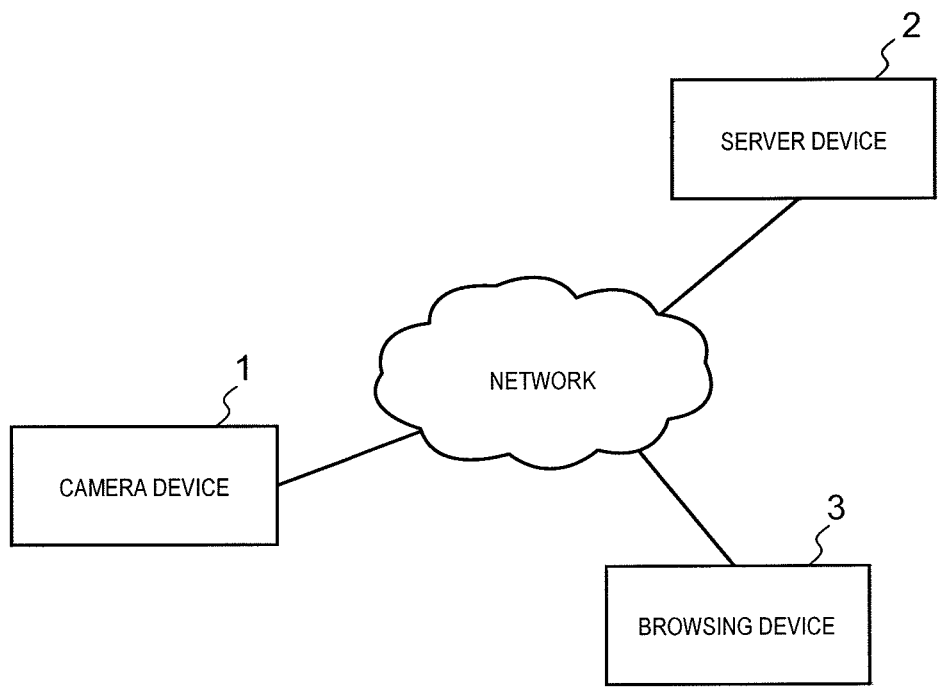
FIG. 1 is an overall configuration diagram of a moving object monitoring system according to an exemplary embodiment.

According to a first aspect of the present invention, there is provided a moving object monitoring device that synthesizes a color image and a monochrome image obtained by capturing a monitoring area where a moving object to be monitored appears and outputs the synthesized image, the moving object monitoring device including a color camera that captures the monitoring area using environmental light, a monochrome camera that captures the monitoring area using infrared light, a signal processing unit that processes a signal of a color image output from the color camera and a signal of a monochrome image output from the monochrome camera, a storage unit that stores alignment information generated based on the color image and the monochrome image captured in a state of sufficient environmental light, an alignment unit that performs an alignment, based on the alignment information, to match positions of images of a subject shown respectively in the color image and the monochrome image captured in a state of insufficient environmental light, and an image synthesis unit that acquires color information from the aligned color image and performs color conversion to colorize the monochrome image using the color information.

With this configuration, the color image and the monochrome image captured in a state of insufficient environmental light, such as nighttime are aligned based on the alignment information generated from the color image and the monochrome image captured in a state of sufficient environmental light such as daytime, so that the alignment may be performed with high accuracy. Then, the color information is acquired from the accurately-aligned color image, and the color information is used to colorize the monochrome image, so that the color of the moving object is faithfully reproduced, and a color image of the moving object with excellent visibility may be output.

In a second aspect of the present invention, the storage unit stores a plurality of alignment information for each type of mobile bodies having different shapes, and the alignment unit detects the moving object from the monochrome image and determines the type of the moving object to perform the alignment based on the alignment information according to the type of the moving object.

With this configuration, the color image and the monochrome image may be accurately aligned according to the shape of the moving object.

In a third aspect of the present invention, an alignment information generator that generates alignment information is further included, and the storage unit stores the alignment information generated by the alignment information generator together with information on processing conditions of the signal processing unit as calibration information.

With this configuration, the processing of generating alignment information is performed as a calibration at an appropriate timing during installation or operation of the device, so that the alignment of a color image and a monochrome image may be appropriately performed.

In a fourth aspect of the present invention, the signal processing unit includes a resolution converter that reduces the number of pixels in the color image by adding a signal value of each of a plurality of adjacent pixels in the color image, and a signal processing controller that controls an operation of the resolution converter based on a capturing environment of the monitoring area.

With this configuration, in a status in which there is slight environmental light, the actual color information of the subject is included in the signal value of each pixel, and therefore it is possible to output a color image in which the actual colors of the subject are clearly expressed, by adding the signal values of a plurality of pixels. In addition, since the operation of the resolution converter is controlled based on the capturing environment of the monitoring area, a suitable color image may be output regardless of the capturing environment. In addition, a color image in which the actual colors of the subject are clearly expressed is acquired by the resolution conversion, and color information of the moving object appearing at night may be accurately acquired from this color image.

In a fifth aspect of the present invention, there is provided a server device that receives a color image and a monochrome image obtained by capturing, at a moving object monitoring device, a monitoring area where a moving object to be monitored appears, from the moving object monitoring device through a network, in which the server device includes a communication unit that receives a color image captured at the moving object monitoring device by a color camera that captures the monitoring area using environmental light and a monochrome image captured at the moving object monitoring device by a monochrome camera that captures the monitoring area using infrared light, a storage unit that stores alignment information generated based on the color image and the monochrome image captured in a state of sufficient environmental light, an alignment unit that performs an alignment, based on the alignment information, to match positions of images of a subject shown respectively in the color image and the monochrome image captured in a state of insufficient environmental light, and an image synthesis unit that acquires color information from the aligned color image and performs color conversion to colorize the monochrome image using the color information.

With this configuration, as in the first aspect of the invention, it is possible to faithfully reproduce the color of the moving object and output a color image with excellent visibility of the moving object even in a case of capturing in a state of insufficient environmental light, such as nighttime.

In a sixth aspect of the present invention, there is provided a moving object monitoring system that transmits a color image and a monochrome image obtained by capturing, at a moving object monitoring device, a monitoring area where a moving object to be monitored appears, from the moving object monitoring device to a server device through a network, in which the moving object monitoring includes a color camera that captures the monitoring area using environmental light, a monochrome camera that captures the monitoring area using infrared light, a signal processing unit that processes a signal of a color image output from the color camera and a signal of a monochrome image output from the monochrome camera, a storage unit that stores alignment information generated based on the color image and the monochrome image captured in a state of sufficient environmental light, an alignment unit that performs an alignment, based on the alignment information, to match positions of images of a subject shown respectively in the color image and the monochrome image captured in a state of insufficient environmental light, an image synthesis unit that acquires color information from the aligned color image and performs color conversion to colorize the monochrome image using the color information, and a communication unit that transmits the synthesized image acquired by the image synthesis unit to the server device.

With this configuration, as in the first aspect of the invention, it is possible to faithfully reproduce the color of the moving object and output a color image with excellent visibility of the moving object even in a case of capturing in a state of insufficient environmental light, such as nighttime.

In a seventh aspect of the present invention, a server device includes an alignment information generator that generates alignment information, and a communication unit that transmits the alignment information to a moving object monitoring device, and a moving object monitoring device performs an update processing of a storage unit in accordance with the alignment information received from the server device.

With this configuration, the user may remotely perform the update of the alignment information used in the moving object monitoring device.

Hereinafter, embodiments will be described with reference to the drawings.

First Exemplary Embodiment

FIG. 1 is an overall configuration diagram of a moving object monitoring system according to a first exemplary embodiment.

The moving object monitoring system includes camera device 1 (moving object monitoring device), server device 2 (image storage device), and browsing device 3. Camera device 1, server device 2 and browsing device 3 are connected through a network.

Camera device 1 captures an image of a monitoring area set in a facility, a road, and the like, and outputs a captured image in which a moving object such as a person present in the monitoring area is shown. Server device 2 stores the captured images acquired from camera device 1. Browsing device 3 is a PC, a tablet terminal, a smartphone, and the like, and the user may access server device 2 to browse the captured image stored in server device 2.

Figure 2:
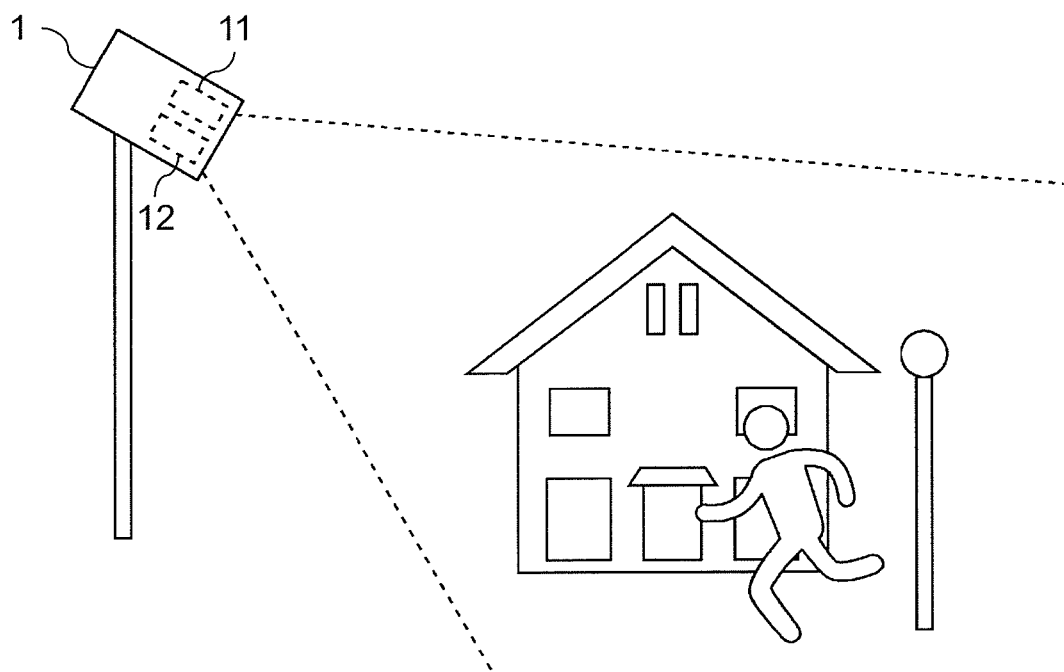
FIG. 2 is an explanatory view showing a capturing status by camera device 1.

Next, camera device 1 will be described. FIG. 2 is an explanatory view showing the capturing status with respect to camera device 1.

Camera device 1 includes color camera 11 and monochrome camera 12. Color camera 11 and monochrome camera 12 capture a subject present in the monitoring area, that is, a moving object such as a person, a building, a site of a facility, a road, and the like.

Color camera 11 includes an infrared light cut filter, captures a subject in color using visible light, and outputs a color image. Monochrome camera 12 includes a visible light cut filter, captures a subject in monochrome with infrared light, and outputs a monochrome image. When capturing with monochrome camera 12, infrared light projector 13 irradiates the subject with near infrared light (see FIG. 3).

Here, when capturing is performed with color camera 11 in a state of insufficient environmental light at night, in a sunset or sunrise time zone, there is a problem that, in a captured color image, a moving object as a subject or a background appears dark, such that it is difficult to discriminate the color of the moving object, for example, the color of clothes of a person or the color of a vehicle body. In addition, in a monochrome image captured using near infrared light by monochrome camera 12, there is a problem that it is shown in a state in which the luminance is inverted such that, for example, blue clothes of a person are captured in white. Therefore, false recognition of the moving object occurs.

Therefore, in the exemplary embodiment, by performing signal processing on the signal of the color image output from color camera 11, even when the image is captured in a state of insufficient environmental light, it is possible to generate a high-quality color image in which the actual colors of the subject are clearly expressed.

Furthermore, in the exemplary embodiment, image synthesis may be performed for synthesizing a color image and a monochrome image which are captured in a state in which environmental light is not sufficient. The image synthesis includes performing a processing of acquiring color information from the color image and colorizing the monochrome image using the color information. In the exemplary embodiment, a high definition monochrome image may be acquired by capturing using near infrared light, and a nighttime color image, in which the color of the moving object is faithfully reproduced in high definition, may be generated by colorizing the monochrome image using the color information acquired from the color image.

At this time, since there is parallax between color camera 11 and monochrome camera 12, the position of the subject shown in the color image and the monochrome image is shifted due to the parallax such that when the color image and the monochrome image are synthesized as they are, there arises a problem that the color of the background appears in the area of the moving object, and the color of the moving object appears in the area of the background.

Therefore, in the exemplary embodiment, alignment processing is performed to match the positions of the subject between the color image and the monochrome image.

Moreover, an example in which the outdoors is a monitoring area is shown in FIG. 2, but the indoors may also be a monitoring area. In this case, in addition to sunshine, the brightness of the environmental light of the monitoring area is changed according to on/off of lighting equipment.

Figure 3:
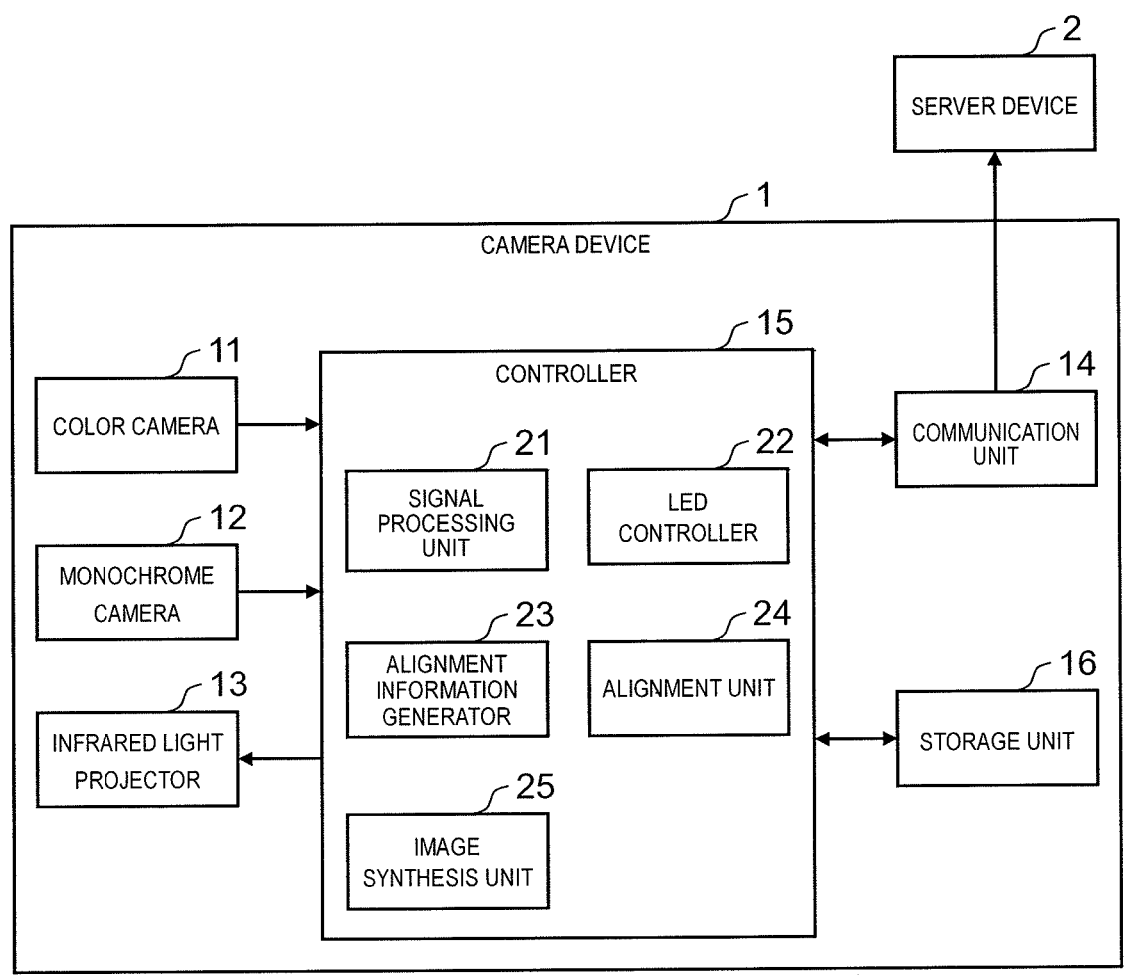
FIG. 3 is a block diagram showing a schematic configuration of camera device 1.

Next, a schematic configuration of camera device 1 will be described. FIG. 3 is a block diagram showing a schematic configuration of camera device 1.

Camera device 1 includes infrared light projector 13, communication unit 14, controller 15, and storage unit 16 in addition to color camera 11 and monochrome camera 12.

Infrared light projector 13 projects near infrared light onto the subject when the subject is captured by monochrome camera 12.

Communication unit 14 communicates with server device 2 through a network. In the exemplary embodiment, the synthesized image generated by controller 15 is transmitted to server device 2. Note that the processed color image and monochrome image generated by controller 15 may be transmitted to server device 2.

At this time, capturing information regarding an installation location, a camera attribute, a capturing time, a capturing condition and the like is added to the image as attribute information and transmitted. The camera attribute relates to whether color or monochrome, identification information of camera device 1 (such as a MAC address), and the like. The capturing condition relates to the exposure time, the gain, and the like.

Text recognition processing may be performed on the monochrome image to acquire text information in the monochrome image, and the text information may be added to the image and transmitted.

Storage unit 16 stores color images, monochrome images, synthesized images, and the like generated by controller 15. Storage unit 16 also stores a program executed by controller 15. In addition, storage unit 16 serves as a calibration memory, and stores calibration information (such as setting values of various parameters) on capturing conditions of color camera 11 and monochrome camera 12 and processing conditions of signal processing on image signals of color images and monochrome images performed by controller 15, and the like.

Controller 15 includes signal processing unit 21, LED controller 22, alignment information generator 23, alignment unit 24, and image synthesis unit 25. Controller 15 is configured by a processor, and each unit of controller 15 is realized by executing a program stored in storage unit 16.

Signal processing unit 21 processes image signals respectively output from color camera 11 and monochrome camera 12.

LED controller 22 controls an LED serving as a light source of infrared light projector 13.

Figure 4:
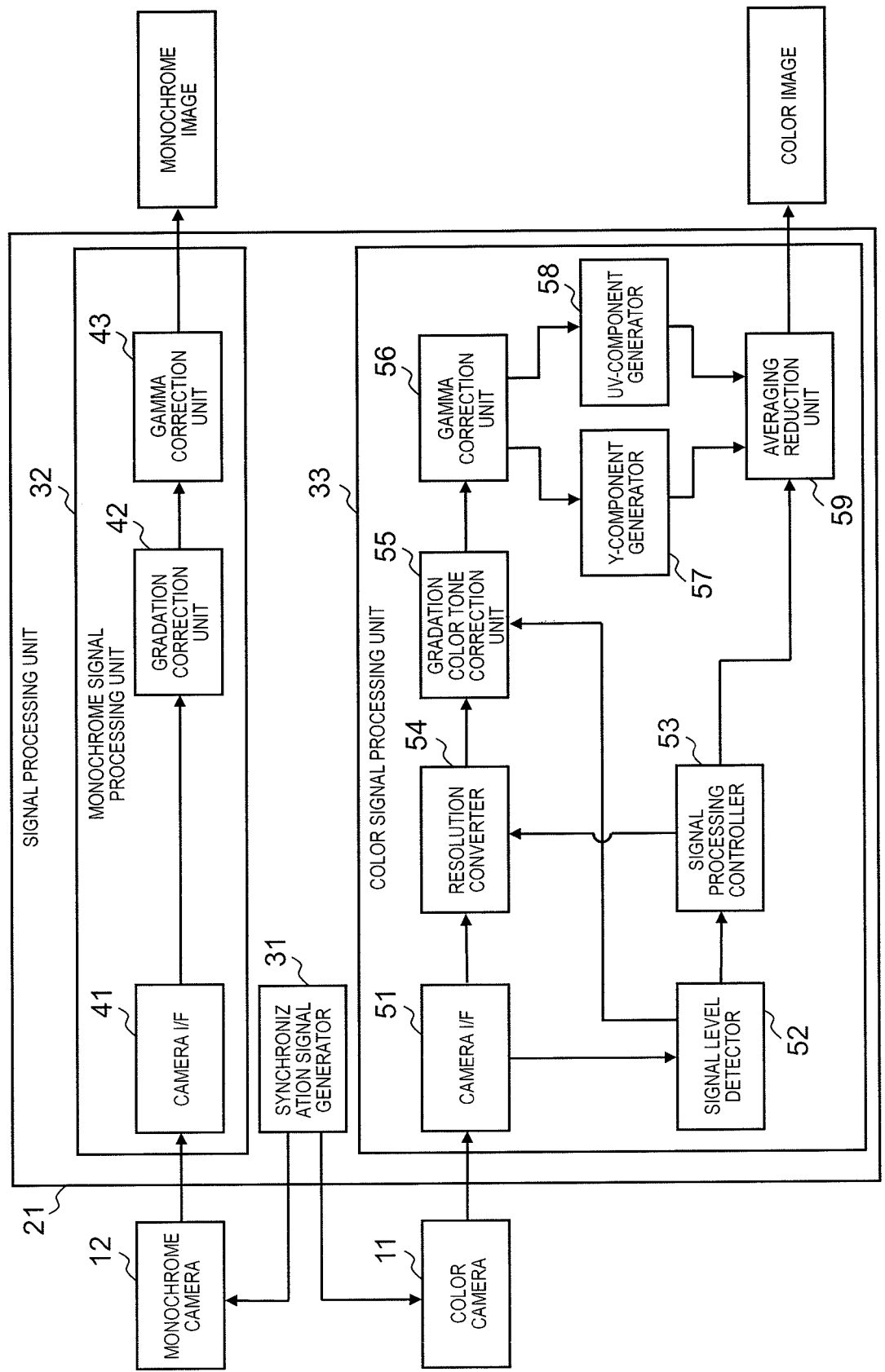
FIG. 4 is a functional block diagram showing a schematic configuration of signal processing unit 21.

Next, signal processing unit 21 will be described. FIG. 4 is a functional block diagram showing a schematic configuration of signal processing unit 21.

Signal processing unit 21 includes synchronization signal generator 31, monochrome signal processing unit 32, and color signal processing unit 33.

Synchronization signal generator 31 generates a synchronization signal for synchronizing color camera 11 and monochrome camera 12. With this synchronization signal, color camera 11 and monochrome camera 12 may capture a subject at the same timing.

Monochrome signal processing unit 32 includes camera interface 41, gradation correction unit 42, and gamma correction unit 43.

Camera interface 41 receives an image signal of a monochrome image output from monochrome camera 12.

Gradation correction unit 42 performs a gradation correction on the image signal of the monochrome image input to camera interface 41.

Gamma correction unit 56 performs gamma correction on the image signal output from gradation correction unit 42 to correct the gradation of the image to the optimum characteristic according to the characteristic of the display device.

Color signal processing unit 33 includes camera interface 51, signal level detector 52, signal processing controller 53, resolution converter 54, gradation color tone correction unit 55, gamma correction unit 56, Y-component generator 57, UV-component generator 58, and averaging reduction unit 59.

Camera interface 51 receives an image signal of a color image output from color camera 11.

Signal level detector 52 detects a signal level based on the image signal of color image input to camera interface 51. This signal level represents the brightness of the entire image which is the capturing environment of the monitoring area, that is, the brightness of the environmental light of the monitoring area, and is detected based on the maximum value of luminance and the distribution status (histogram).

Signal processing controller 53 sets a degree of resolution conversion (reduction ratio) performed by resolution converter 54 with reference to the signal level acquired by signal level detector 52. Further, signal processing controller 53 sets a degree of averaging reduction (reduction ratio) performed by averaging reduction unit 59 in accordance with the degree of resolution conversion. Note that the degree of resolution conversion includes the case where the operation of resolution converter 54 is stopped and the resolution conversion is not performed, and the degree of averaging reduction includes the case where the operation of averaging reduction unit 59 is stopped and the averaging reduction is not performed. In this example, although the degree of resolution conversion (reduction ratio) performed by resolution converter 54 is set based on the signal level acquired by signal level detector 52 as the capturing environment of the monitoring area, signal level detector 52 may not be adapted, in which case a control table may be held to set the degree of resolution conversion for each nighttime zone (1 or more) according to the daytime and nighttime settings established for each day. In addition, instead of the signal level detector 52, an illuminance sensor or the like may be provided, and the capturing environment may be determined based on the sensor output.

Resolution converter 54 performs the resolution conversion on an image signal of a color image input to camera interface 51 by integrating signal values of a plurality of adjacent pixels to reduce the number of pixels.

Gradation color tone correction unit 55 performs the gradation correction and color tone correction on the image signal of the color image output from resolution converter 54. As the gradation correction, for example, a gain adjustment is performed to brighten an image. As the color tone correction, for example, white balance correction is performed to suppress the influence of the color tone of the environmental light.

Gamma correction unit 56 performs gamma correction on the image signal output from gradation color tone correction unit 55 to correct the gradation of the image to the optimum characteristic according to the characteristic of the display device.

Y-component generator 57 generates an image signal of the Y-component (luminance signal) from the image signal output from gamma correction unit 56. UV-component generator 58 generates image signals (color difference signals) of U-component and V-component from the image signal output from gamma correction unit 56.

Averaging reduction unit 59 performs processing of reducing the color image to a predetermined size by averaging signal values of a predetermined number of pixels with respect to the image signals output from Y-component generator 57 and UV-component generator 58, respectively.

Figure 5:
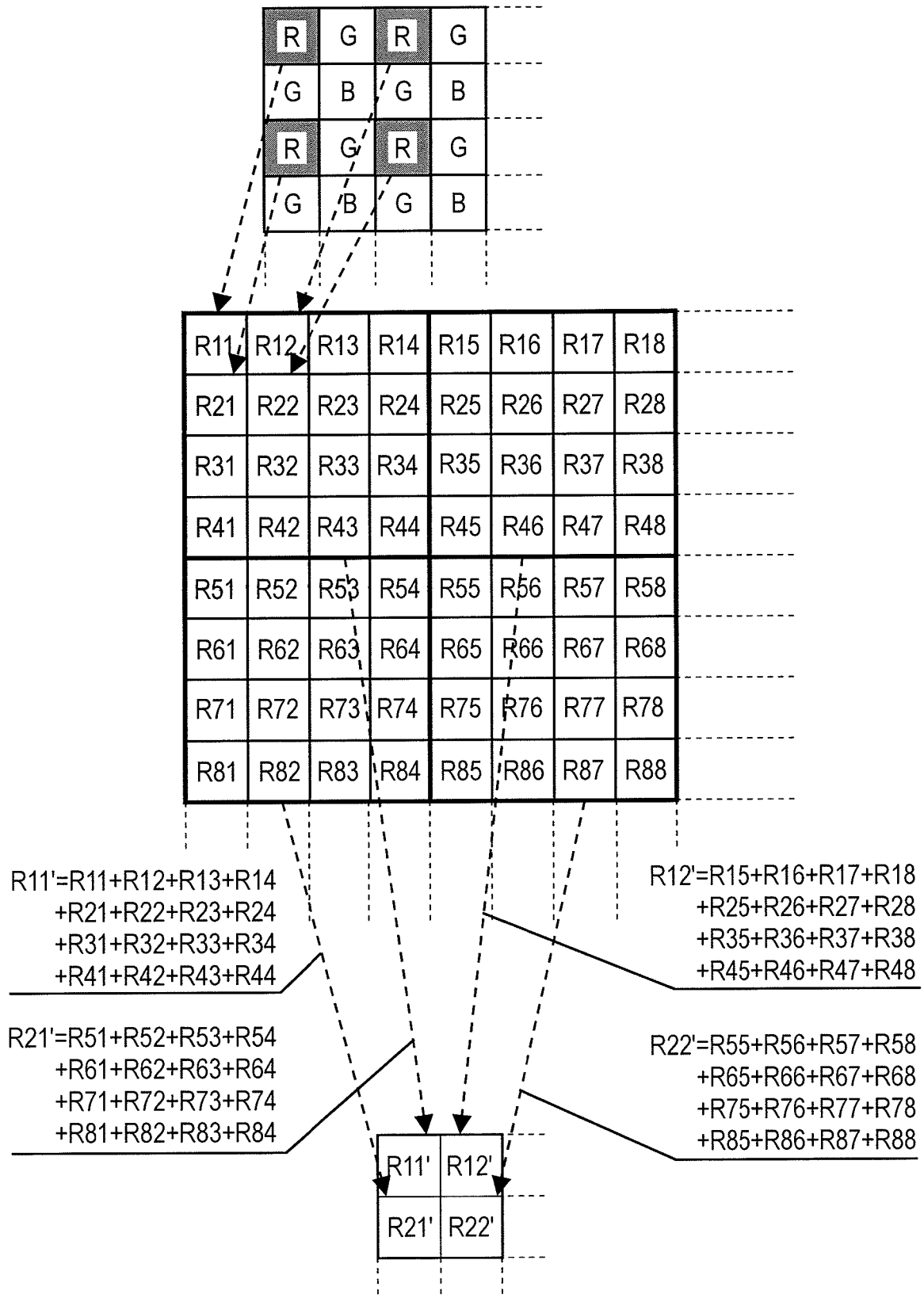
FIG. 5 is an explanatory view showing an outline of a resolution conversion performed by resolution converter 54.
Figure 6A:
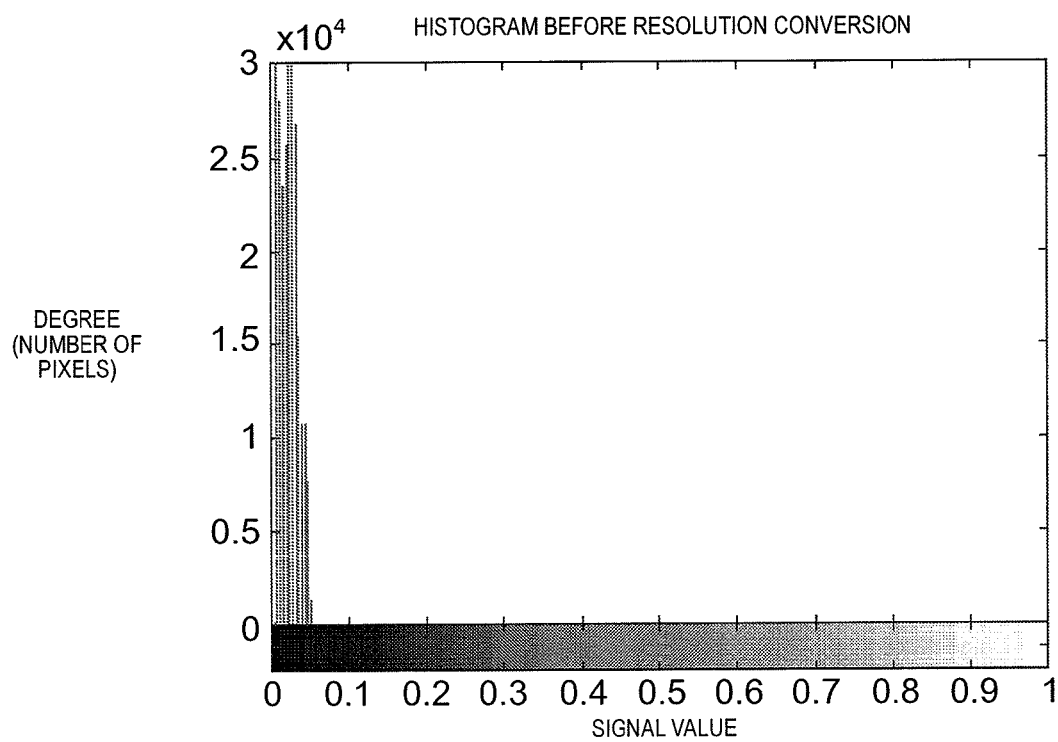
FIG. 6A is an explanatory view showing a histogram before the resolution conversion.
Figure 6B:
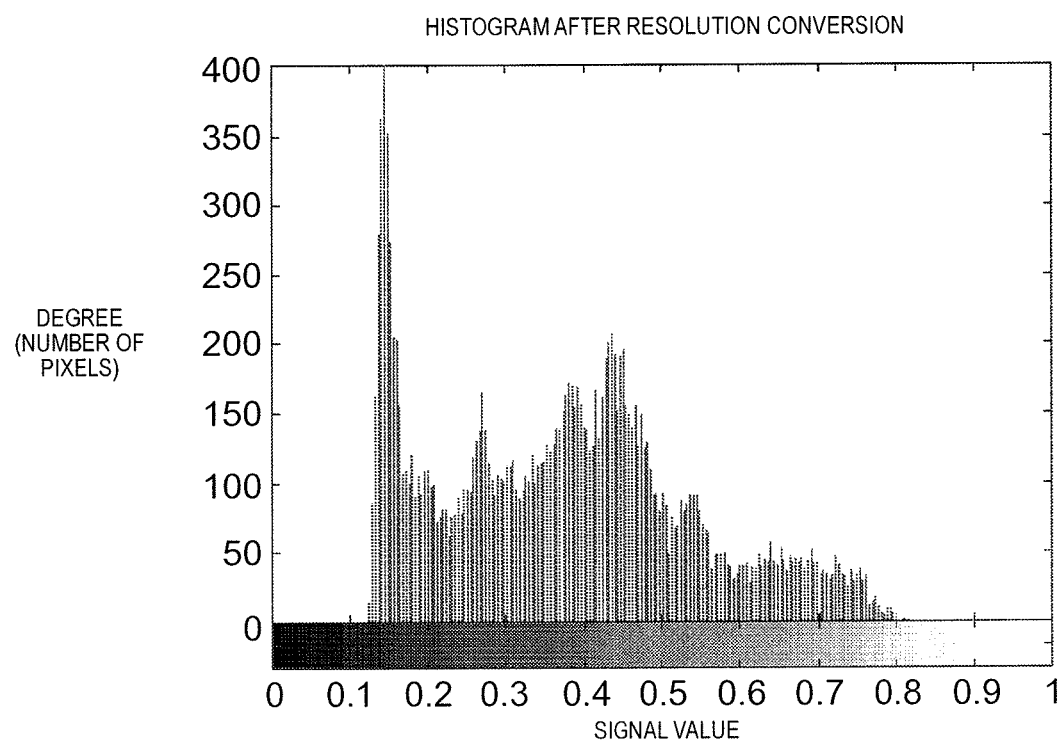
FIG. 6B is an explanatory view showing a histogram after the resolution conversion.

Next, the resolution conversion performed by resolution converter 54 will be described. FIG. 5 is an explanatory view showing the outline of the resolution conversion. FIGS. 6A and 6B are explanatory views showing histograms before and after the resolution conversion.

In the capturing element of color camera 11, as shown in FIG. 5, pixels of each color of R, B and G are arranged in a Bayer pattern.

As shown in FIG. 5, resolution converter 54 adds the signal values of a predetermined number of adjacent pixels with respect to the pixels of the same color, and uses the sum total value as a signal value of one pixel as shown in FIG. 5.

In the example shown in FIG. 5, the signal values of a total of 16 pixels of 4×4 are added. This increases the capturing sensitivity by 16 times. In addition, the resolution is lowered to 1/16, and an amount of data is reduced to 1/16.

Note that, although FIG. 5 shows about R, this equally applies to B and G.

By performing such resolution conversion, compared to the signal values that are biased to a dark range before the resolution conversion as shown in FIG. 6A, the signal values are spread over a wide range after the resolution conversion as shown in FIG. 6B.

As described above, in the exemplary embodiment, the resolution conversion is performed to reduce the number of pixels of a color image by adding signal values of a plurality of pixels. As a result, in a status in which there is slight environmental light due to streetlights, lighting of buildings, and the like, the actual color information of the subject is included in the signal value of each pixel, and therefore it is possible to output a color image in which the actual colors of the subject are clearly expressed, by adding the signal values of a plurality of pixels. In particular, it is easy to identify mobile subjects in which, for example, the colors of clothes are expressed clearly in the case of a person, and the colors of a vehicle body are expressed clearly in the case of a vehicle, so that false recognition of a moving object may be avoided.

Meanwhile, since the color image generated by camera device 1 is transmitted to server device 2 through the network, it is desirable to reduce an amount of the data of the color image for the purpose of reducing the communication load.

Here, it is conceivable to perform compression processing such as JPEG, but when compression processing is performed on a color image captured in a state of insufficient environmental light, such as nighttime, the compression noise, which does not occur in the color image captured in a state of sufficient environmental light such as daytime, is noticeable and the image quality is greatly lowered.

On the other hand, in the exemplary embodiment, by performing the resolution conversion, the number of pixels of a color image is reduced, so the amount of data of the color image may be reduced. Further, the compression processing may be further performed on the resolution-converted color image, and in this case, the compression noise may be significantly reduced as compared to the case in which the compression processing is performed without performing the resolution conversion.

Figures 7, 8:
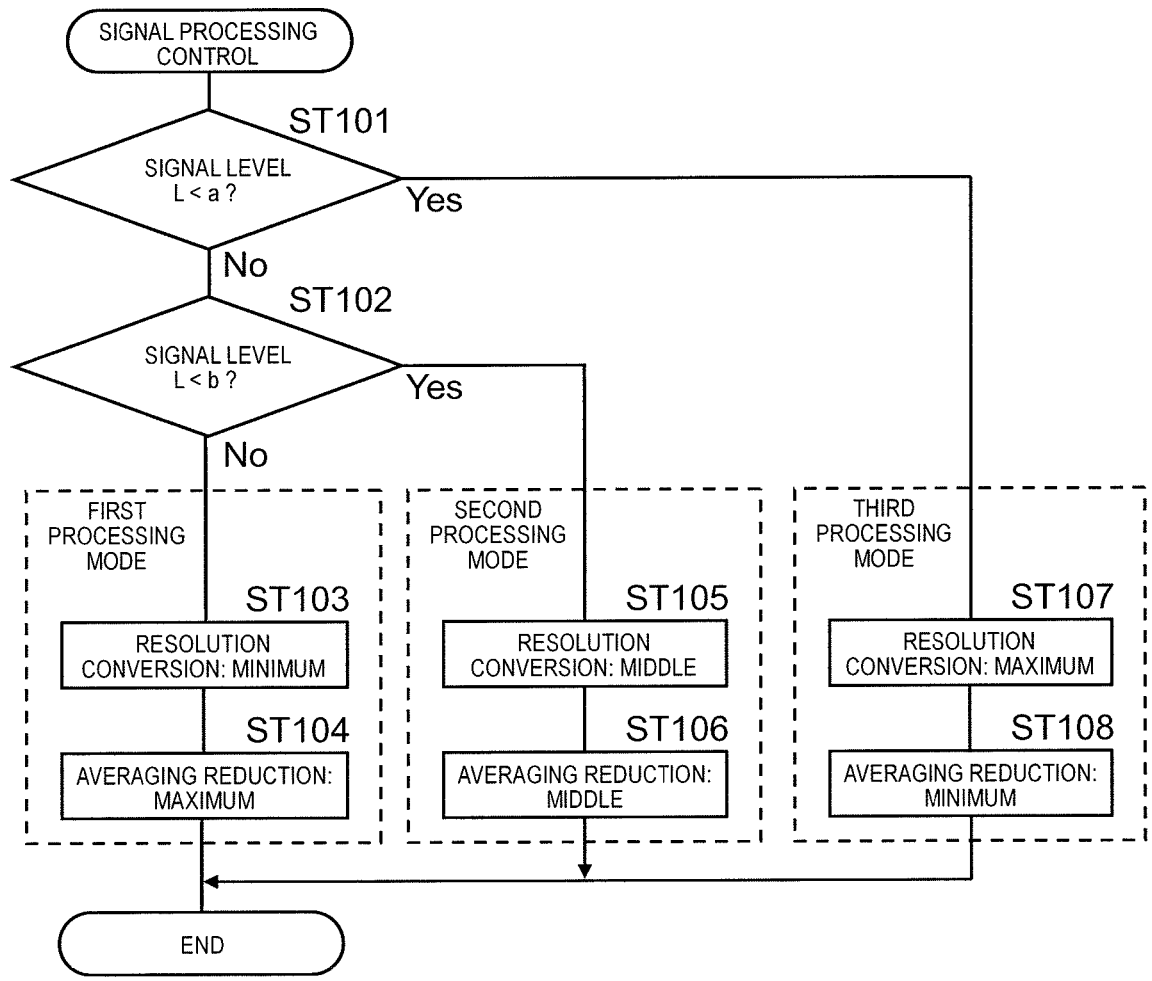
FIG. 7 is an explanatory view showing a processing mode set by signal processing controller 53.
FIG. 8 is a flowchart showing a procedure of processing performed by signal processing controller 53.

Next, the processing performed by signal processing controller 53 will be described. FIG. 7 is an explanatory view showing a processing mode set by signal processing controller 53. FIG. 8 is a flowchart showing the procedure of processing performed by signal processing controller 53.

Signal processing controller 53 compares the signal level acquired by signal level detector 52 with a plurality of threshold values, and changes the degree of resolution conversion to be performed by resolution converter 54 in steps based on the comparison result.

In the example shown in FIG. 7, three levels (minimum, middle, maximum) are set as the degree of resolution conversion, which are divided for three processing modes based on the signal level. Thereby, appropriate resolution conversion may be performed so that the signal value of each pixel is not saturated.

The first processing mode is performed in a bright state at daytime. In this first processing mode, the level of resolution conversion is minimum, and the reduction ratio of resolution conversion is 1, that is, the resolution conversion is not performed.

The second processing mode is performed in a dimmed state as in the sunset or sunrise time zone. In this second processing mode, the level of resolution conversion is middle, and the reduction ratio of resolution conversion is ¼. That is, by adding the signal values of a total of four pixels of 2×2, the resolution conversion is performed to set the resolution to ¼.

The third processing mode is implemented in a dark state such as at night. In this third processing mode, the level of resolution conversion is maximum, and the reduction ratio of resolution conversion is ¹⁄₁₆. That is, by adding the signal values of a total of 16 pixels of 4×4, the resolution conversion is performed to set the resolution to ¹⁄₁₆.

Further, signal processing controller 53 sets the degree of averaging reduction performed by averaging reduction unit 59 in accordance with the degree of resolution conversion in order to finally obtain a color image of the same size regardless of the degree of resolution conversion performed by resolution converter 54.

That is, when the reduction ratio of resolution conversion in the first processing mode is 1, the level of averaging reduction is maximum, and the reduction ratio of averaging reduction is set to ¹⁄₁₆. When the reduction ratio of resolution conversion in the second processing mode is ¼, the level of averaging reduction is middle, and the reduction ratio of averaging reduction is set to ¼. When the reduction ratio of resolution conversion in the third processing mode is ¹⁄₁₆, the level of averaging reduction is minimum, and the reduction ratio of averaging reduction is set to 1. That is, the averaging reduction is not performed. As a result, a color image reduced to ¹⁄₁₆ is obtained in all processing modes.

Specifically, as shown in FIG. 8, the signal level L acquired by signal level detector 52 is compared with the two threshold values a and b (a<b) to determine whether or not the signal level L is less than the threshold value a (ST101), and whether the signal level L is less than the threshold value b (ST102). Thus, the levels of resolution conversion and averaging reduction are determined in the three processing modes.

That is, when the signal level L is equal to or greater than the threshold value b (No in ST102), that is, when in bright state such as daytime, the first processing mode is set, and accordingly, the level of resolution conversion is set to minimum (ST103) and the level of averaging reduction is set to the maximum (ST104).

In addition, when the signal level L is equal to or greater than the threshold value a and less than the threshold value b (Yes in ST102), that is, when in a dimmed state as in the sunset or sunrise time zone, the second processing mode is set, and accordingly, the level of resolution conversion is set to the middle (ST105) and the level of averaging reduction is set to the middle (ST106).

Further, when the signal level L is less than the threshold value a (Yes in ST101), that is, when in a dark state such as at night, the third processing mode is set, and accordingly, the level of resolution conversion is set to the maximum (ST107) and the level of averaging reduction is set to the minimum (ST108).

In the examples shown in FIGS. 7 and 8, there are three cases (first to third processing modes) divided in accordance with the signal level, but there may be two divided cases or four or more divided cases. In addition, although the reduction ratio of resolution conversion is set to 1, ¼, and ¹⁄₁₆, it is possible to perform the resolution conversion with various reduction ratio by adding the signal values of a total of 64 pixels of 8×8 to perform the resolution conversion at a resolution of ¹⁄₁₆, and the like.

Figure 9:
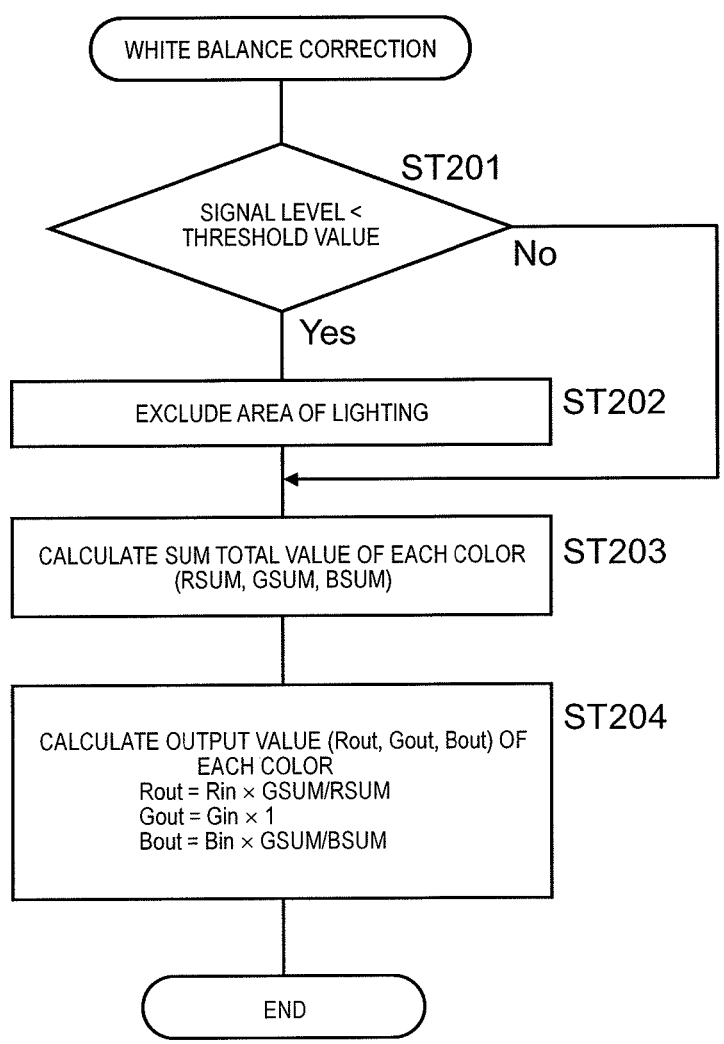
FIG. 9 is a flowchart showing a procedure of white balance correction performed by gradation color tone correction unit 55.

Next, white balance correction performed by gradation color tone correction unit 55 will be described. FIG. 9 is a flow chart showing the procedure of white balance correction.

Gradation color tone correction unit 55 performs white balance correction on the image signal of the color image output from resolution converter 54. The white balance correction corrects the color tone, while regarding the brightest (high-luminance) area as white. Therefore, in an image in which a night lighting, for example, a street lamp or a headlight of a vehicle is shown, the area of the lighting is the brightest, so this area is regarded as white and the color tone is corrected. At this time, when the light of the lighting is not white, a color fogging is generated in which the color of the image is generally deviated.

Therefore, in the exemplary embodiment, the white balance correction is performed excluding the area of the lighting.

Specifically, first, it is determined whether or not the signal level acquired by signal level detector 52 is less than a predetermined threshold value (ST201). This threshold value is to identify nighttime and daytime.

Here, when the signal level is less than the threshold value (Yes in ST201), that is, when it is night, the area of the lighting in the color image is detected, and the pixels included in the area of the lighting are excluded from aggregation targets (ST202).

Next, the signal value of each pixel to be aggregated is added for each color of RGB, and the sum total value (RSUM, GSUM, BSUM) of each color is calculated (ST203). Then, the input value (Rin, Gin, Bin) of each color is multiplied by the gain of each color based on the sum total value of each color to calculate the output value (Rout, Gout, Bout) of each color (ST204). At this time, correction based on G is performed.

On the other hand, when the signal level is equal to or greater than the threshold value (No in ST201), that is, when it is daytime, the sum total value of each color is calculated with all pixels in the color image as aggregation targets (ST203) and the output value of each color is calculated (ST204).

Next, gradation correction performed by gradation color tone correction unit 55 will be described. FIGS. 10A, 10B, 10C, and 10D are explanatory views showing a status of gradation correction performed by gradation color tone correction unit 55.

Gradation color tone correction unit 55 adds a gain to the image signal of the color image output from resolution converter 54 to perform the gradation correction (gain adjustment) to brighten the color image.

Figure 10A:
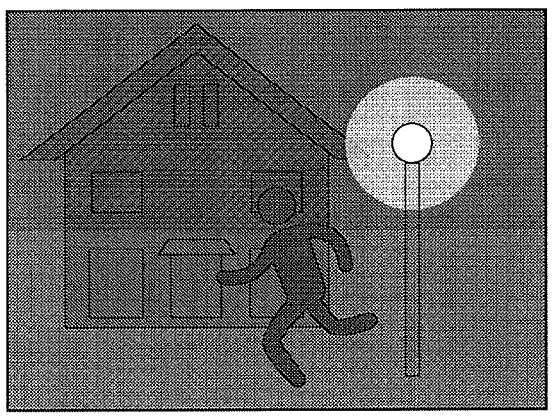
FIG. 10A is an explanatory view showing an original image to be applied with gradation correction performed by gradation color tone correction unit 55.

The example shown in FIGS. 10A to 10D is a nighttime color image in which the light of a street lighting is shown, and as shown in FIG. 10A, the original image is dark as a whole, and it is difficult to see the subject.

Figure 10B:
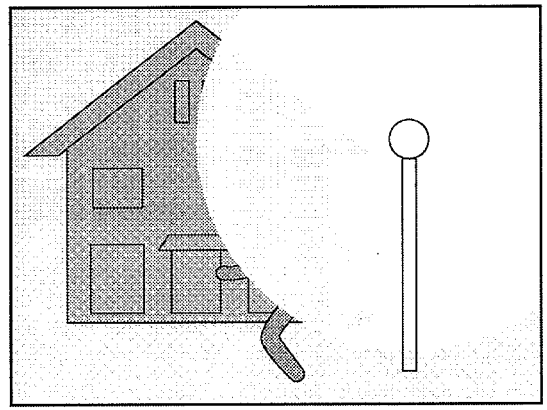
FIG. 10B is an explanatory view showing a case in which a large gain is uniformly given by gradation color tone correction unit 55.

Here, when a large gain is uniformly applied to the image signal of the original image, the entire image is bright and the subject may be easily seen in an area away from the lighting as shown in FIG. 10B, but with halation being noticeable, it is difficult to see the subject in the area in the vicinity of the lighting.

Figure 10C:
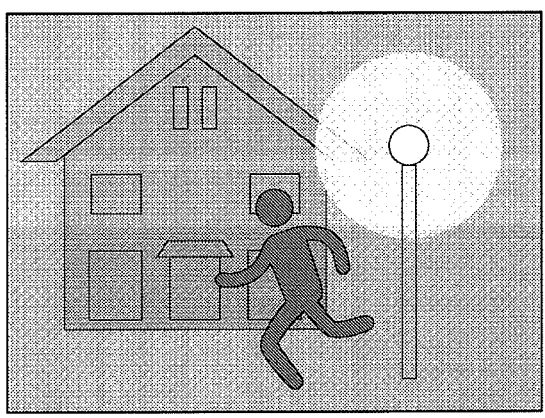
FIG. 10C is an explanatory view showing a case in which a small gain is uniformly given by gradation color tone correction unit 55.

On the other hand, when a small gain is uniformly applied to the image signal of the original image, as shown in FIG. 10C, the halation is reduced, but the entire image is only slightly brightened, and the state in which the subject is difficult to see is not much improved.

Therefore, in the exemplary embodiment, gradation correction optimized according to areas is performed. That is, a large gain is given to the dark area away from the lighting, and a small gain is given to the bright area in the vicinity of the lighting.

Figure 10D:
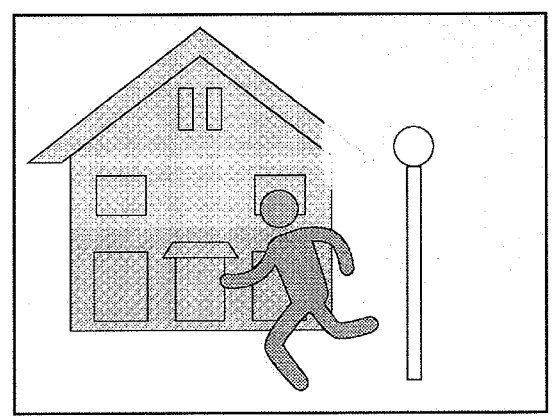
FIG. 10D is an explanatory view showing a case in which gradation correction of an exemplary embodiment is performed by gradation color tone correction unit 55.

As a result, as shown in FIG. 10D, the subject in the area away from the lighting is easy to see, and the halation is reduced so that the subject in the area in the vicinity of the lighting is also easy to see. As described above, by providing different gains according to the areas, it is possible to acquire an optimal image that is not affected by halation.

Figure 11:
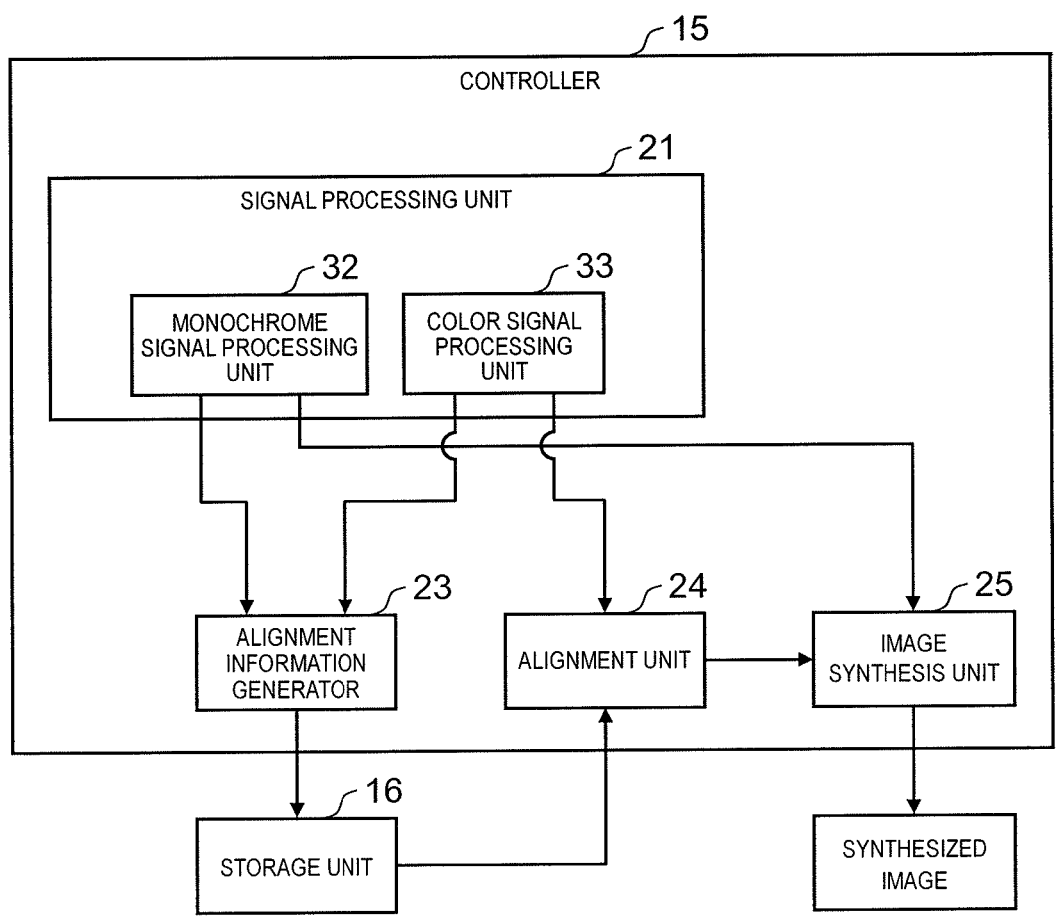
FIG. 11 is a block diagram showing the main parts related to the processing performed by alignment information generator 23, alignment unit 24, and image synthesis unit 25.
Figure 12:
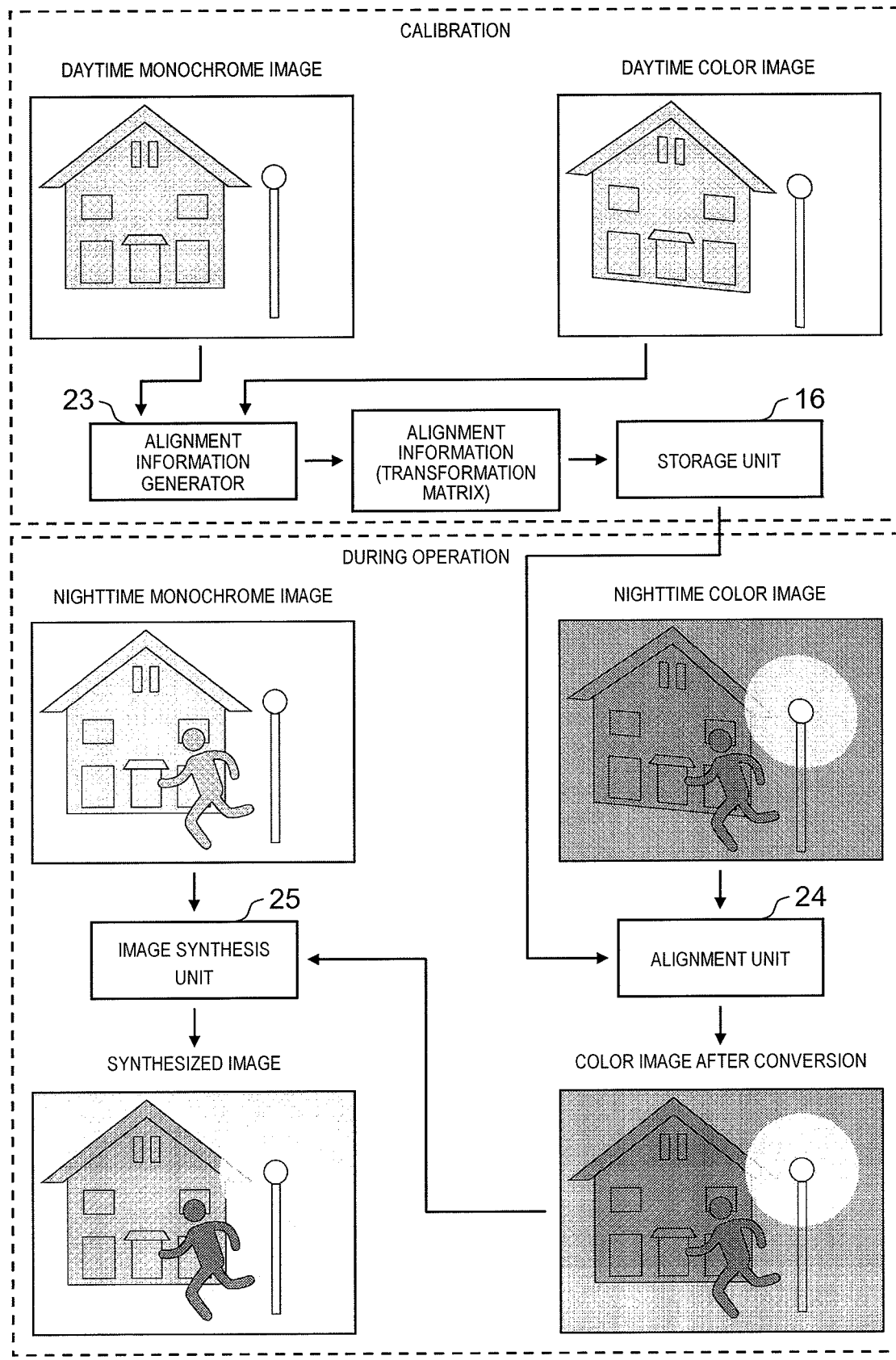
FIG. 12 is an explanatory view showing an outline of processing performed by alignment information generator 23, alignment unit 24, and image synthesis unit 25.

Next, processing performed by alignment information generator 23, alignment unit 24, and image synthesis unit 25 will be described. FIG. 11 is a block diagram of the main parts related to the processing performed by alignment information generator 23, alignment unit 24, and image synthesis unit 25. FIG. 12 is an explanatory view showing an outline of the processing performed by alignment information generator 23, alignment unit 24, and image synthesis unit 25.

As shown in FIG. 11, alignment information generator 23 generates a transformation matrix (alignment information) used for the geometric transformation (alignment) performed by alignment unit 24 based on the monochrome image output from monochrome signal processing unit 32 and the color image output from color signal processing unit 33 (see FIG. 12). In the exemplary embodiment, image matching is performed between the monochrome image and the color image, a plurality of feature points corresponding to the monochrome image and the color image are acquired, and a transformation matrix is estimated using the feature points.

The processing of alignment information generator 23 is performed as a calibration before the operation, and is performed using the color image and the monochrome image captured simultaneously with color camera 11 and monochrome camera 12 in a state of sufficient environmental light such as daytime.

Here, when color camera 11 and monochrome camera 12 are separate monocular cameras, the relative positional relationship between color camera 11 and monochrome camera 12 varies in accordance with the installation conditions. Even with the configuration in which color camera 11 and monochrome camera 12 are housed in the same housing to prevent variation in the positional relationship between color camera 11 and monochrome camera 12, for example, the capturing conditions are varied depending on the place of installation such as, for example, the capturing distances from color camera 11 and monochrome camera 12 to the position where a moving object appears are varied. Therefore, for calibration before the operation, a transformation matrix (alignment information) is acquired for each camera device 1.

In addition, when captured in a state of insufficient environmental light, such as nighttime, the color image is dark, unclear, and noisy, and for such a color image, image matching with a monochrome image may not appropriately be performed. For this reason, the transformation matrix is acquired using the color image and monochrome image captured in a state of sufficient environmental light such as daytime.

In addition, since the luminance gradient may differ between the color image captured using visible light and the monochrome image captured using near infrared light, image matching using a method robust against the luminance gradient such as phase correlation method is performed.

The transformation matrix generated by alignment information generator 23 is stored in storage unit 16 as calibration data.

During operation, alignment unit 24 performs geometric transformation, for example, projection conversion on the color image output from color signal processing unit 33 using the transformation matrix (alignment information) acquired by alignment information generator 23 (see FIG. 12). Thereby, the position of the image of the subject appearing in the color image may be matched with the monochrome image.

Image synthesis unit 25 synthesizes the aligned color image output from alignment unit 24 and the monochrome image output from monochrome signal processing unit 32 to generate a synthesized image (see FIG. 12). For this image synthesis, color information is acquired from the aligned color image, and color conversion is performed to colorize the monochrome image using the color information. A known image synthesis technique may be used for this image synthesis.

Figure 13:
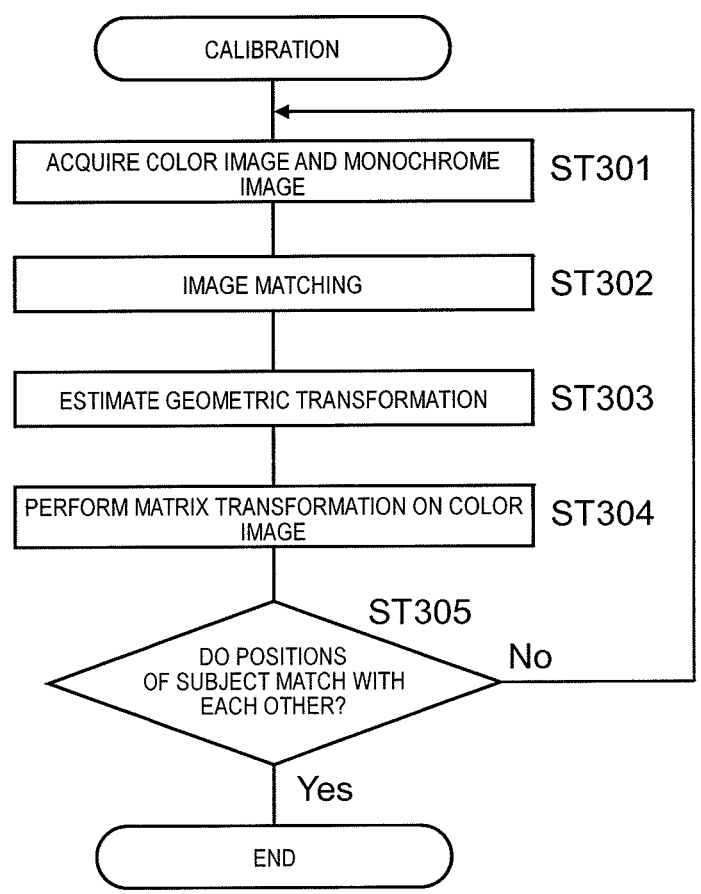
FIG. 13 is a flowchart showing a procedure of processing of calibration.
Figure 14:
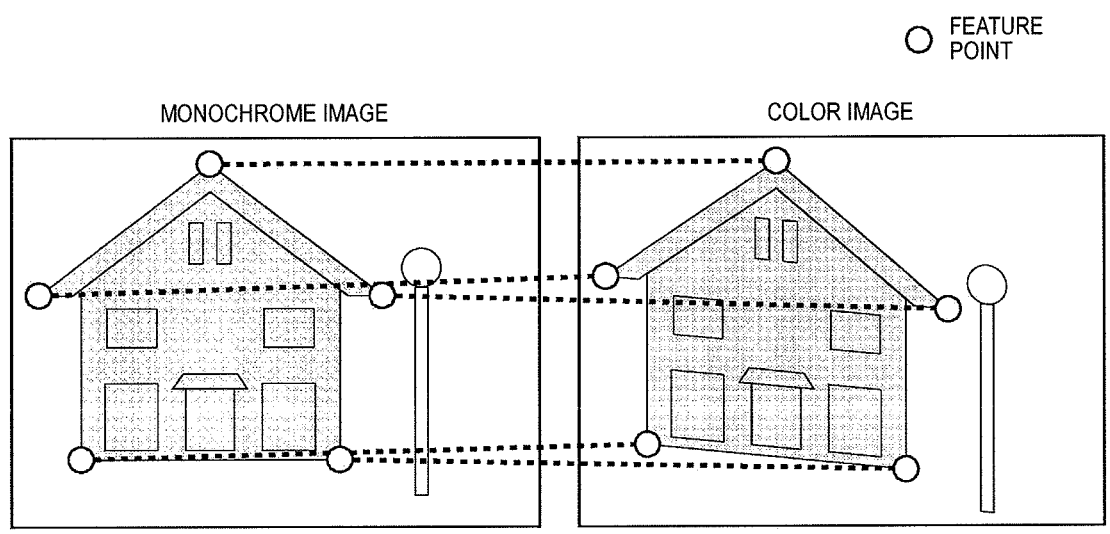
FIG. 14 is an explanatory view showing a status of image matching.

Next, the calibration will be described. FIG. 13 is a flowchart showing a procedure of processing of calibration. FIG. 14 is an explanatory view showing the status of image matching.

This calibration is performed by default when camera device 1 is installed. In addition, since the relative positional relationship between color camera 11 and monochrome camera 12 changes due to the influence of vibration, strong wind or the like, it may be performed periodically during operation.

As shown in FIG. 13, in calibration, alignment information generator 23 first acquires a color image and a monochrome image captured in the daytime (ST301).

Next, image matching is performed between the color image and the monochrome image (ST302). In this image matching, a plurality of feature points corresponding to monochrome images and color images are acquired (see FIG. 14).

Next, a transformation matrix for use in the geometric transformation is estimated using the acquired feature points (ST303). Specifically, a transformation matrix H such as the following equation is obtained. Here, the projection transformation is performed as the geometric transformation.

$$H = \begin{bmatrix} S\cos\theta & -S\sin\theta & Tx \\ S\sin\theta & S\cos\theta & Ty \\ 0 & 0 & 1 \end{bmatrix} \quad \text{(Equation 1)}$$

S: scale (magnification, reduction), θ: rotation, Tx, Ty: amount of translation

Next, the geometric transformation is performed on the color image using the acquired transformation matrix (ST304).

At this time, coordinates (x, y) of the color image are converted to coordinates (x', y') as expressed by the following equation.

$$\begin{bmatrix} x' \\ y' \\ 1 \end{bmatrix} = H \cdot \begin{bmatrix} x \\ y \\ 1 \end{bmatrix} \quad \text{(Equation 2)}$$

Note that this equation is likewise used in the geometric transformation during operation.

Next, the color image applied with the geometric transformation is compared with the monochrome image to determine whether or not the positions of the subject match with each other (ST305). At this time, when the positions of the subject match with each other (Yes in ST305), the acquired transformation matrix is stored in storage unit 16. On the other hand, when the positions of the subject do not match with each other (No in ST305), another color image and monochrome image are acquired, and the processing described above is repeated.

In addition, depending to the determination result of the positions of the subject, the parameter of the geometric transformation may be finely adjusted in accordance with the operation input from the user.

Figure 15:
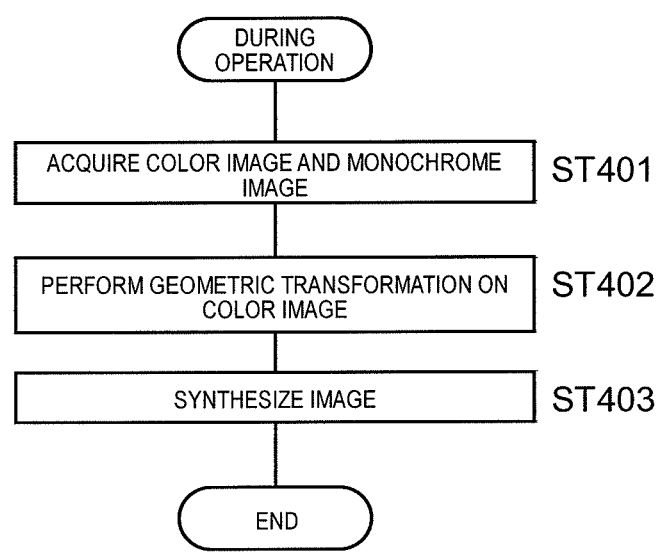
FIG. 15 is a flowchart showing a procedure of processing in operation.

Next, processing in operation will be described. FIG. 15 is a flowchart showing the procedure of processing in operation.

During operation, first, alignment unit 24 acquires a color image and a monochrome image captured at night (ST401). Next, the geometric transformation is performed on the color image using the transformation matrix acquired by calibration (ST402). Next, image synthesis unit 25 synthesizes the color image and the monochrome image applied with the geometric transformation (ST403).

Second Exemplary Embodiment

Figure 16A:
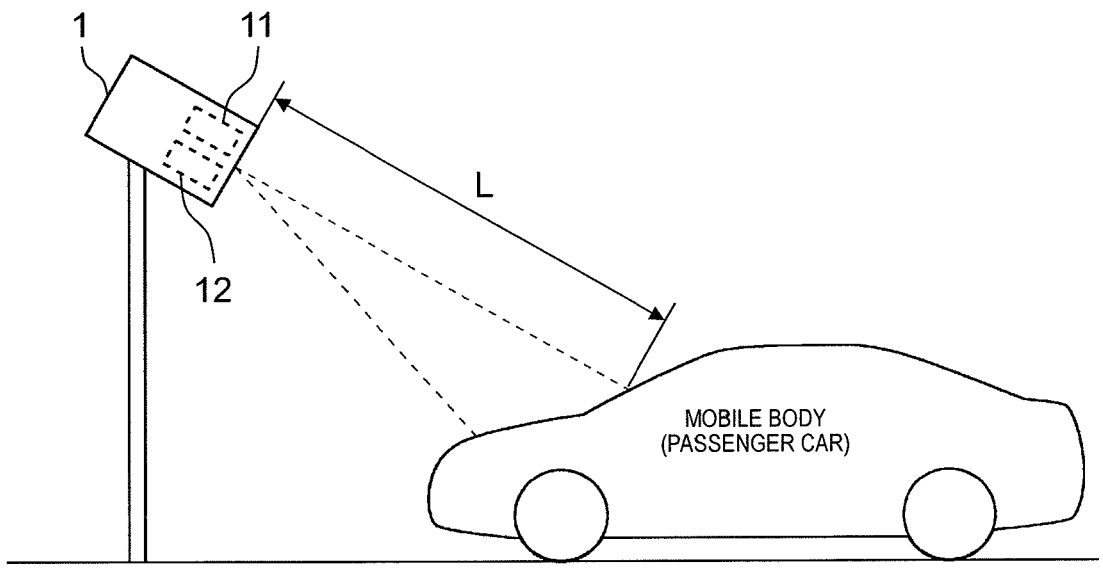
FIG. 16A is an explanatory view showing a status of capturing a moving object having a different shape.
Figure 16B:
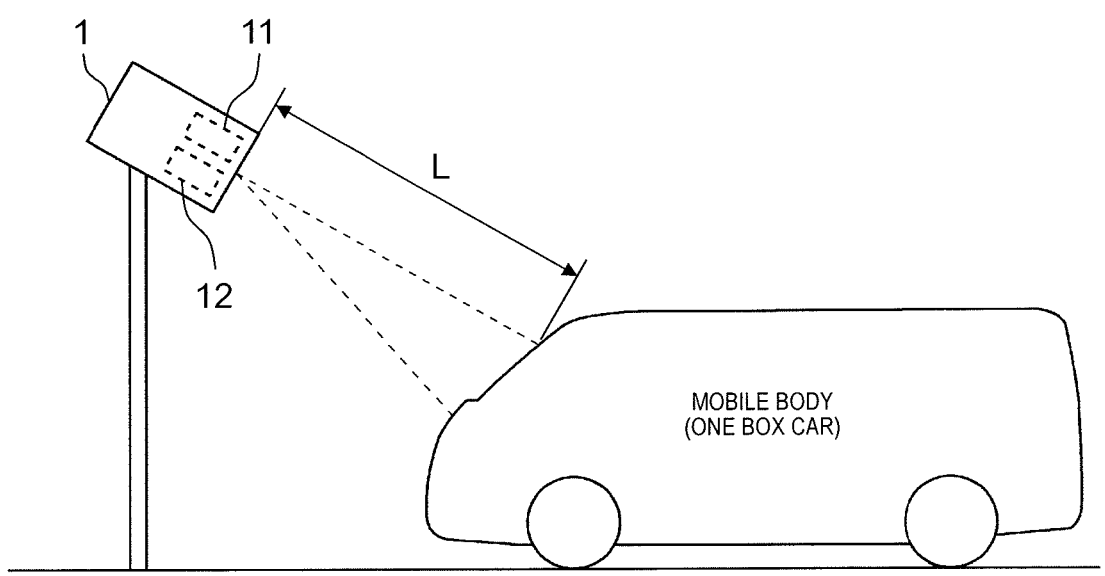
FIG. 16B is an explanatory view showing a status of capturing a moving object having a different shape.

Next, the second exemplary embodiment will be described. The points not particularly mentioned here are the same as the exemplary embodiments described above. FIGS. 16A and 16B are explanatory views showing a status of capturing a moving object having a different shape.

When the shape of the moving object is different, the distance from color camera 11 and the monochrome camera to the surface of the moving object is varied. For example, as shown in FIG. 16A, in the case in which the moving object is a passenger car with a bonnet, and as shown in FIG. 16B, in the case in which the moving object is a one box car without a bonnet, even in a state in which the moving object is in the same position, the distance L from color camera 11 and monochrome camera 12 to the surface of the moving object is different from each other.

As described above, when the distance L from color camera 11 and the monochrome camera to the surface of the moving object varies depending to the shape of the moving object, the displacement of the image of the moving object varies due to the influence of parallax between color camera 11 and monochrome camera 12.

Therefore, in the exemplary embodiment, in the calibration, a plurality of transformation matrices (alignment information) are created for each type of moving object having different shapes, and in operation, the type of moving object is determined, and the geometric conversion is performed using the transformation matrix corresponding to the type of moving object. Here, the type of moving object may be determined using the high definition monochrome image.

In addition, in order to acquire a transformation matrix for each type of moving object, the moving object may be actually disposed in the monitoring area or an appropriate place that provides the same capturing conditions as the monitoring area, the moving object may be captured by color camera 11 and monochrome camera, and the transformation matrix may be acquired based on the obtained color image and monochrome image. Further, markers may be arranged instead of the moving object.

Figure 17:
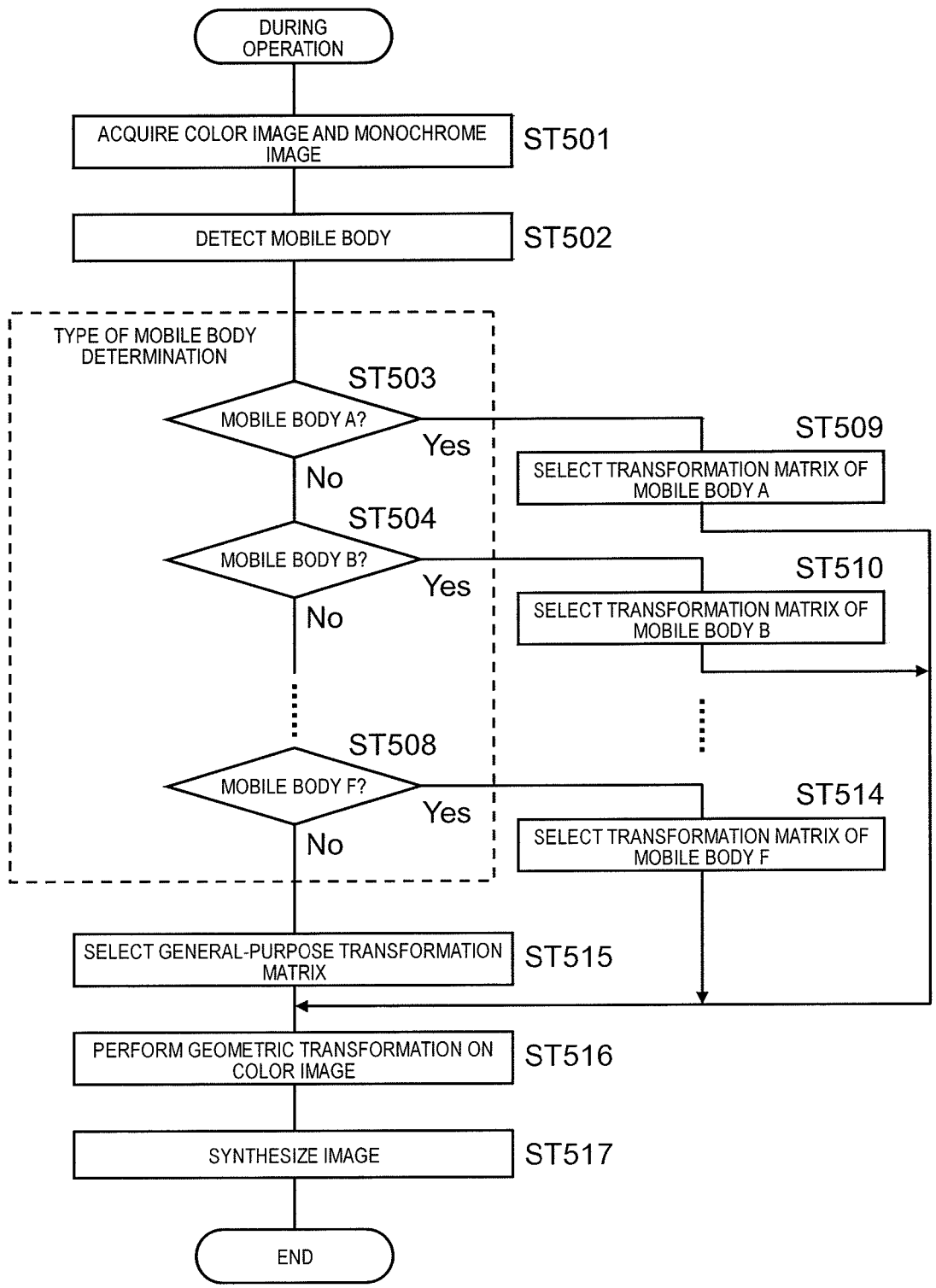
FIG. 17 is a flowchart showing a procedure of processing in operation according to a second exemplary embodiment.

Next, the procedure of processing in operation in the second exemplary embodiment will be described. FIG. 17 is a flowchart showing the procedure of processing in operation.

During operation, first, alignment unit 24 acquires a color image and a monochrome image captured at night (ST501). Then, a moving object is detected from the monochrome image (ST502).

Next, the type of the detected moving object is determined, and a transformation matrix corresponding to the type of the moving object is selected. In the example shown in FIG. 17, the determination is sequentially performed as to whether or not the moving object corresponds to types A to F (ST503 to ST508), and the transformation matrix corresponding to the moving object types A to F is selected (ST509 to ST514). When it corresponds to none of them, a general-purpose transformation matrix is selected (ST515).

Next, the geometric transformation is performed on the color image using the selected transformation matrix (ST516). Next, image synthesis unit 25 synthesizes the color image and the monochrome image applied with the geometric transformation (ST517).

Third Exemplary Embodiment

Figure 18:
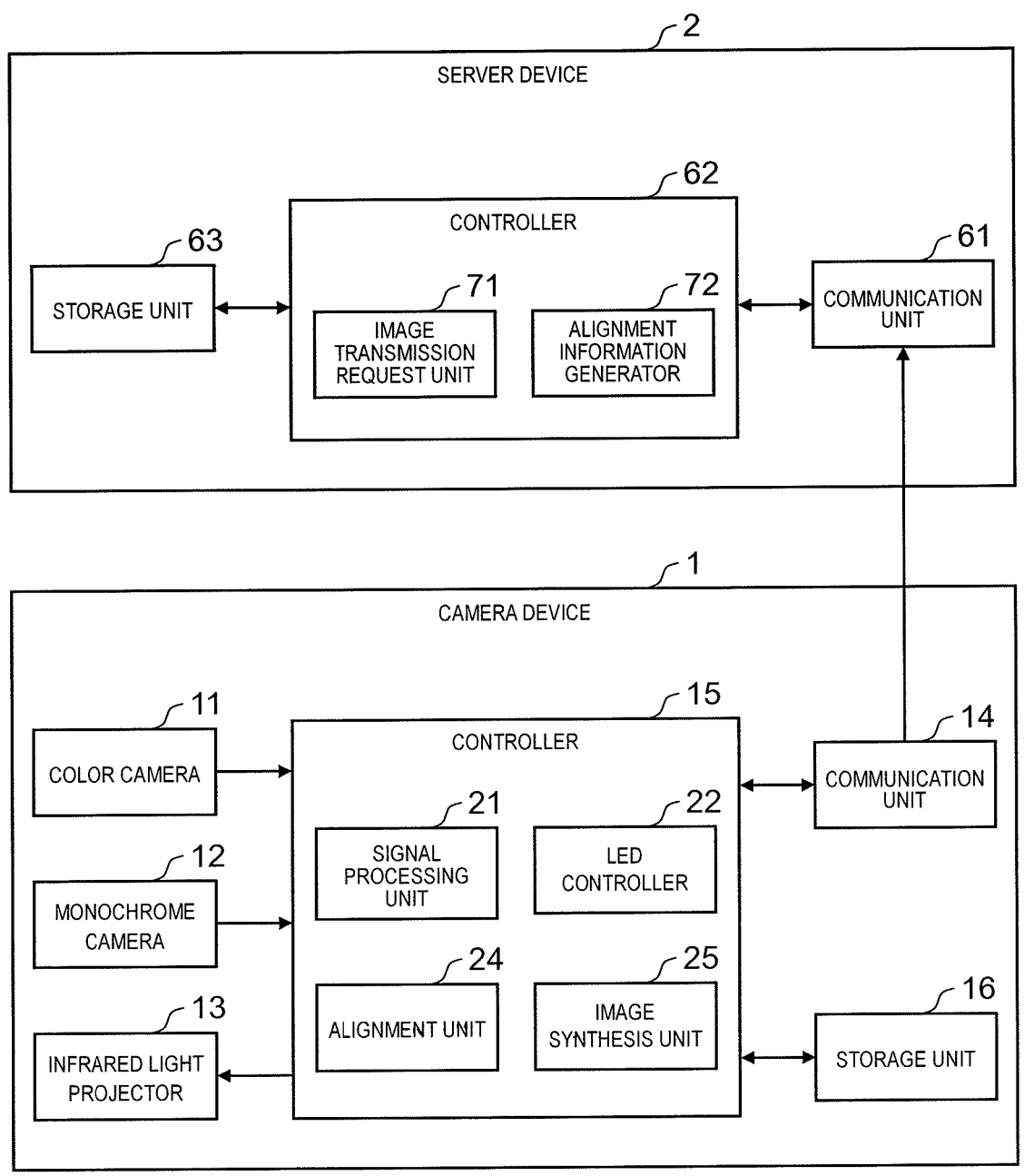
FIG. 18 is an explanatory view showing a schematic configuration of camera device 1 and server device 2 according to a third exemplary embodiment.

Next, the third exemplary embodiment will be described. The points that are the same as the exemplary embodiments described above will not be particularly mentioned below. FIG. 18 is an explanatory view showing a schematic configuration of camera device 1 and server device 2 according to the third exemplary embodiment.

In the exemplary embodiments described above, in calibration, camera device 1 performs the processing of generating the alignment information (transformation matrix) for use in the alignment (geometric transformation) for matching the positions of a subject shown respectively in the color image and the monochrome image, while in the exemplary embodiment, server device 2 is configured to perform the processing of generating the alignment information.

Server device 2 includes communication unit 61, controller 62, and storage unit 63.

Communication unit 61 communicates with camera device 1 through a network.

In this exemplary embodiment, in calibration, an image transmission request with respect to a color image and a monochrome image for use in generation of alignment information is transmitted to camera device 1, and the color image and monochrome image are transmitted from camera device 1 in response to the image transmission request and received. Further, the alignment information generated by the controller 62 is transmitted to camera device 1. In addition, during operation, a synthesized image is periodically transmitted from camera device 1 and received.

Storage unit 63 stores the color image and the monochrome image received by communication unit 61, alignment information generated by the controller 62, and the like. In addition, storage unit 63 stores a program executed by controller 62.

Controller 62 includes image transmission request unit 71 and alignment information generator 72. Controller 62 is configured of a processor, and each unit of controller 62 is realized by executing a program stored in storage unit 63.

Image transmission request unit 71 causes communication unit 61 to transmit an image transmission request for instructing camera device 1 to simultaneously capture a color image and a monochrome image in a state of sufficient environmental light such as daytime and transmit the color image and the monochrome image.

When receiving the color image and the monochrome image transmitted from camera device 1 in response to the image transmission request from communication unit 61, alignment information generator 72 generates, based on the color image and the monochrome image, the alignment information (transformation matrix) for use in the alignment (geometric transformation) to be performed by alignment unit 24 of camera device 1. The alignment information generated by alignment information generator 72 is transmitted from communication unit 61 to camera device 1.

When receiving the image transmission request transmitted from server device 2, camera device 1 captures a color image and a monochrome image and transmits the images to server device 2. In addition, when receiving the alignment information transmitted from server device 2, camera device 1 performs an update processing of storage unit 16 according to the received alignment information.

Thereby, the user may remotely operate to perform default setting and update of the alignment information used in camera device 1.

In the exemplary embodiment, although server device 2 that stores the image transmitted from camera device 1 generates the alignment information, a device that stores the image and a device that generates the alignment information may be provided separately.

Fourth Exemplary Embodiment

Figure 19:
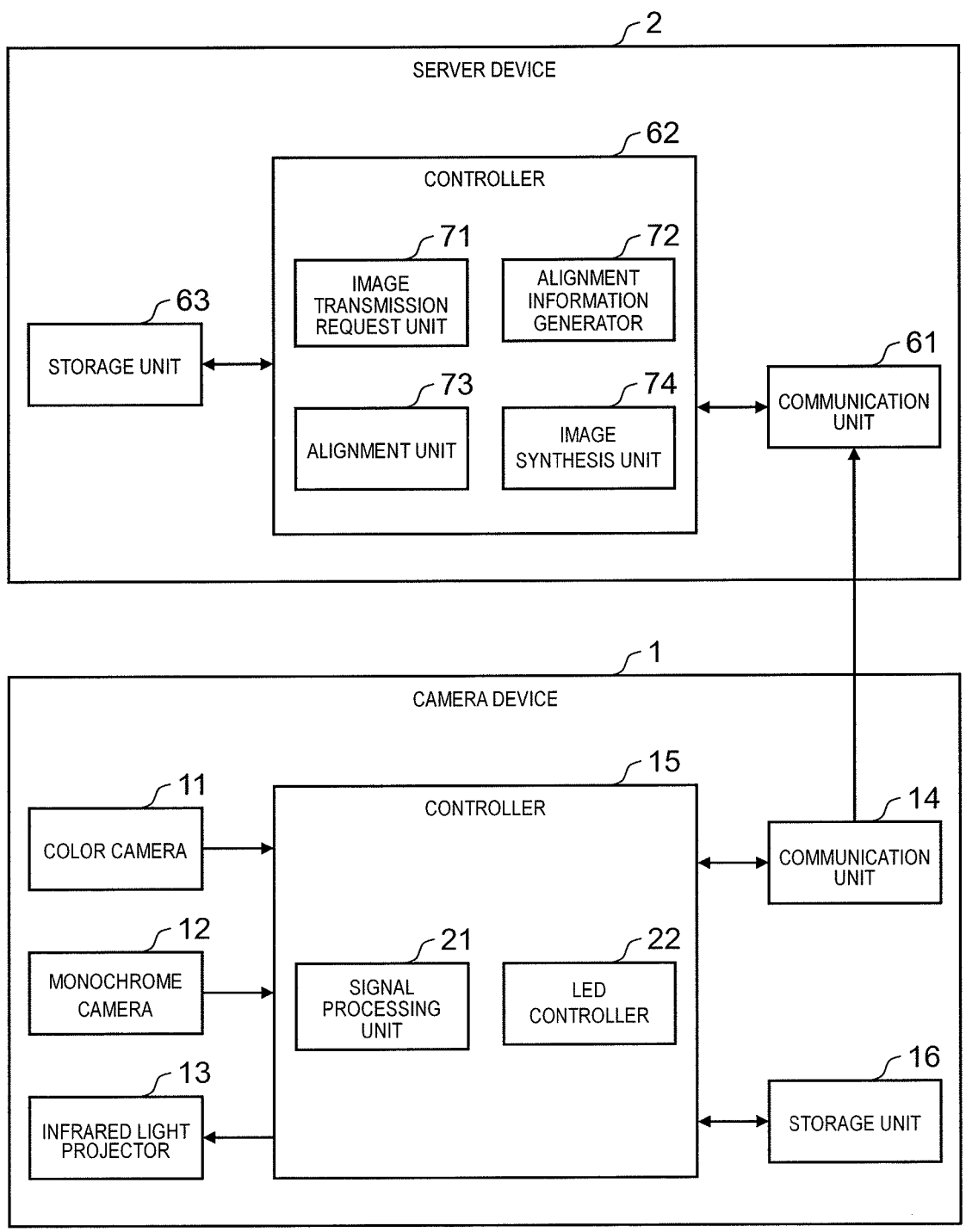
FIG. 19 is an explanatory view showing a schematic configuration of camera device 1 and server device 2 according to a fourth exemplary embodiment.

Next, the fourth exemplary embodiment will be described. The points that are the same as the exemplary embodiments described above will not be particularly mentioned below. FIG. 19 is an explanatory view showing a schematic configuration of camera device 1 and server device 2 according to the fourth exemplary embodiment.

In the exemplary embodiments described above, the alignment between the color image and the monochrome image, and the image synthesis of the color image and the monochrome image are performed by camera device 1, while in this exemplary embodiment, the alignment and the image synthesis may be performed by server device 2.

That is, controller 62 of server device 2 includes alignment unit 73 and image synthesis unit 74. Alignment unit 73 performs geometric transformation on the color image transmitted from camera device 1 using the transformation matrix (alignment information) acquired by alignment information generator 72. Image synthesis unit 74 synthesizes the aligned color image output from alignment unit 73 and the monochrome image transmitted from camera device 1 to generate a synthesized image. The processing performed by alignment unit 73 and image synthesis unit 74 is the same as the processing of alignment unit 24 and image synthesis unit 25 of camera device 1 in the exemplary embodiments described above.

As described above, the exemplary embodiments have been described as an example of the technique disclosed in the present application. However, the technology in the present disclosure is not limited to these, and may also be applied to exemplary embodiments in which changes, replacements, additions, deletion, and the like are applied. In addition, it is also possible to combine each component described in the exemplary embodiment described above to form a new exemplary embodiment.

For example, in the exemplary embodiments described above, an example in which the moving object to be monitored is mainly a person is described, but the moving object to be monitored is not limited to a person, and may be an animal or a vehicle.

In the exemplary embodiments described above, while the control is performed based on the signal level representing the brightness of the environmental light, the control based on time information may be performed since the brightness of the environmental light changes regularly with changes of the sunshine hours according to the season or time. However, since the brightness of the environmental light changes according to weather, the control based on the signal level may provide the control with higher accuracy.

In the exemplary embodiments described above, various image processing (signal processing) such as resolution conversion is performed at the camera device, but all or some of these image processing may be performed in the server device. However, because the resolution conversion and the averaging reduction processings reduce the communication load by reducing an amount of data of the image, it is desirable that these processings are performed at the camera device.

INDUSTRIAL APPLICABILITY

The moving object monitoring device, the server device, and the moving object monitoring system according to the exemplary embodiments have an effect that it is possible to faithfully reproduce the color of a moving object and output a color image with excellent visibility of the moving object even when capturing takes place in a state of insufficient environmental light, such as nighttime, and are useful as a moving object monitoring device that outputs an image obtained by capturing a monitoring area in which the moving object to be monitored appears, a server device that receives a color image and a monochrome image obtained by capturing, at the moving object monitoring device, the monitoring area from the moving object monitoring device through a network, and a moving object monitoring system that transmits the image obtained by capturing the monitoring area from the moving object monitoring device to an image storage device through a network.

REFERENCE MARKS IN THE DRAWINGS

1 CAMERA DEVICE (MOVING OBJECT MONITORING DEVICE)
2 SERVER DEVICE (IMAGE STORAGE DEVICE)
11 COLOR CAMERA
12 MONOCHROME CAMERA
14 COMMUNICATION UNIT
15 CONTROLLER
16 STORAGE UNIT
21 SIGNAL PROCESSING UNIT
23 ALIGNMENT INFORMATION GENERATOR
24 ALIGNMENT UNIT
25 IMAGE SYNTHESIS UNIT
53 SIGNAL PROCESSING CONTROLLER
54 RESOLUTION CONVERTER
61 COMMUNICATION UNIT
63 STORAGE UNIT
72 ALIGNMENT INFORMATION GENERATOR
73 ALIGNMENT UNIT
74 IMAGE SYNTHESIS UNIT

The invention claimed is:

1. A moving object monitoring device that synthesizes a color image and a monochrome image obtained by capturing a monitoring area where a moving object to be monitored appears and outputs the synthesized image, the moving object monitoring device comprising:
    a color camera that captures the monitoring area using environmental light;
    a monochrome camera that captures the monitoring area using infrared light;

a processor that processes a signal of a color image output from the color camera and a signal of a monochrome image output from the monochrome camera; and a memory that stores alignment information generated based on the color image and the monochrome image captured in a state of sufficient environmental light, wherein the moving object monitoring device is stationary, wherein the processor further performs an alignment, based on the alignment information, to match positions of images of a subject shown respectively in the color image and the monochrome image captured in a state of insufficient environmental light, and acquires color information from the aligned color image and performs color conversion to colorize the monochrome image using the color information, wherein the processor modifies capturing sensitivity of the color camera based on a detected signal level, the capturing sensitivity being increased by adding of signal values of adjacent pixels, wherein, when the capturing sensitivity is increased, correspondingly reducing resolution by an inverse amount, wherein the processor selects one of a first processing mode, a second processing mode, and a third processing mode based on the detected signal level of the color image, wherein, when the detected signal level is greater than or equal to both a first threshold and a second threshold, the first processing mode is selected for signal processing, wherein, when the detected signal level is greater or equal to the first threshold and less than the second threshold, the second processing mode is selected for signal processing, wherein, when the detected signal level is less than the first threshold, the third processing mode is selected for signal processing, wherein the first processing mode, the second processing mode, and the third processing mode have different levels of resolution conversion, and wherein the first processing mode, the second processing mode, and the third processing mode have different levels of averaging reduction.

2. The moving object monitoring device of claim 1, wherein the memory stores a plurality of pieces of the alignment information for each type of the moving object having a different shape, and wherein the processor detects the moving object from the monochrome image, determines the type of the moving object, and performs the alignment based on the alignment information according to the type of the moving object.

3. The moving object monitoring device of claim 1, wherein the processor generates the alignment information, and wherein the memory stores the alignment information generated by the processor as calibration information together with information on processing conditions of the processor.

4. A server device that receives a color image and a monochrome image obtained by capturing, at a moving object monitoring device, a monitoring area where a moving object to be monitored appears, from the moving object monitoring device through a network, the server device comprising:

a communication device that receives a color image captured at the moving object monitoring device by a color camera that captures the monitoring area using environmental light and a monochrome image captured at the moving object monitoring device by a monochrome camera that captures the monitoring area using infrared light, wherein the moving object monitoring device is stationary;

a memory that stores alignment information generated based on the color image and the monochrome image captured in a state of sufficient environmental light; and a processor that performs an alignment, based on the alignment information, to match positions of images of a subject shown respectively in the color image and the monochrome image captured in a state of insufficient environmental light; and acquires color information from the aligned color image and performs color conversion to colorize the monochrome image using the color information, wherein capturing sensitivity of the color camera is modified based on a detected signal level, the capturing sensitivity being increased by adding of signal values of adjacent pixels, wherein, when the capturing sensitivity is increased, resolution is correspondingly reduced by an inverse amount, wherein the processor selects one of a first processing mode, a second processing mode, and a third processing mode based on the detected signal level of the color image, wherein, when the detected signal level is greater than or equal to both a first threshold and a second threshold, the first processing mode is selected for signal processing, wherein, when the detected signal level is greater or equal to the first threshold and less than the second threshold, the second processing mode is selected for signal processing, wherein, when the detected signal level is less than the first threshold, the third processing mode is selected for signal processing, wherein the first processing mode, the second processing mode, and the third processing mode have different levels of resolution conversion, and wherein the first processing mode, the second processing mode, and the third processing mode have different levels of averaging reduction.

5. A moving object monitoring system that transmits a color image and a monochrome image obtained by capturing, at a moving object monitoring device, a monitoring area where a moving object to be monitored appears, from the moving object monitoring device to a server device through a network, wherein the moving object monitoring device is stationary and includes a color camera that captures the monitoring area using environmental light, a monochrome camera that captures the monitoring area using infrared light, a processor that processes a signal of a color image output from the color camera and a signal of a monochrome image output from the monochrome camera, a memory that stores alignment information generated based on the color image and the monochrome image captured in a state of sufficient environmental light, wherein the processor further
performs an alignment, based on the alignment information, to match positions of images of a subject shown respectively in the color image and the monochrome image captured in a state of insufficient environmental light, and
acquires color information from the aligned color image and performs color conversion to colorize the monochrome image using the color information, and
a communication device that transmits a synthesized image acquired by the processor to the server device,
wherein the processor modifies capturing sensitivity of the color camera based on a detected signal level, the capturing sensitivity being increased by adding of signal values of adjacent pixels,
wherein, when the capturing sensitivity is increased, resolution is correspondingly reduced by an inverse amount,
wherein the processor selects one of a first processing mode, a second processing mode, and a third processing mode based on the detected signal level of the color image,
wherein, when the detected signal level is greater than or equal to both a first threshold and a second threshold, the first processing mode is selected for signal processing,
wherein, when the detected signal level is greater or equal to the first threshold and less than the second threshold, the second processing mode is selected for signal processing,
wherein, when the detected signal level is less than the first threshold, the third processing mode is selected for signal processing,
wherein the first processing mode, the second processing mode, and the third processing mode have different levels of resolution conversion, and
wherein the first processing mode, the second processing mode, and the third processing mode have different levels of averaging reduction.

6. The moving object monitoring system of claim 5, wherein the server device includes:

a processor that generates the alignment information; and a communication device that transmits the alignment information to the moving object monitoring device, wherein the moving object monitoring device performs an update processing of the memory in accordance with the alignment information received from the server device.

* * * * *